(12) United States Patent
Lamminpää et al.

(10) Patent No.: US 12,275,896 B2
(45) Date of Patent: Apr. 15, 2025

(54) CATALYTIC HYDROTREATING OF FEEDSTOCKS

(71) Applicant: Neste Oyj, Espoo (FI)

(72) Inventors: Kaisa Lamminpää, Porvoo (FI); Marina Lindblad, Porvoo (FI); Maaria Seläntaus, Porvoo (FI); Kaija Isokoski, Porvoo (FI); Marja Tiitta, Porvoo (FI); Emma Sairanen, Porvoo (FI); Ville Paasikallio, Porvoo (FI)

(73) Assignee: NESTE OYJ, Espoo (FI)

( * ) Notice: Subject to any disclaimer, the term of this patent is extended or adjusted under 35 U.S.C. 154(b) by 200 days.

(21) Appl. No.: 17/787,834

(22) PCT Filed: Dec. 18, 2020

(86) PCT No.: PCT/FI2020/050848
§ 371 (c)(1),
(2) Date: Jun. 21, 2022

(87) PCT Pub. No.: WO2021/130407
PCT Pub. Date: Jul. 1, 2021

(65) Prior Publication Data
US 2023/0069301 A1 Mar. 2, 2023

(30) Foreign Application Priority Data
Dec. 23, 2019 (FI) .................................. 20196126

(51) Int. Cl.
C10G 3/00 (2006.01)
B01J 27/051 (2006.01)
(Continued)

(52) U.S. Cl.
CPC .............. C10G 3/44 (2013.01); B01J 27/051 (2013.01); B01J 35/23 (2024.01); B01J 35/393 (2024.01);
(Continued)

(58) Field of Classification Search
CPC ........ B01J 27/051; B01J 35/23; B01J 35/393; B01J 37/20; C01G 39/06; C01P 2002/04;
(Continued)

(56) References Cited

U.S. PATENT DOCUMENTS 4,557,821 A 12/1985 Lopez et al.
8,022,259 B2 9/2011 Bauer et al.
(Continued)

FOREIGN PATENT DOCUMENTS

CN 109475854 A 3/2019
KR 101184428 B1 9/2012
(Continued)

OTHER PUBLICATIONS

Veryasov, G. et al, 2014, Catalyst Communications, 46, 183-186. (Year: 2014).*
(Continued)

Primary Examiner — Brian A McCaig
(74) Attorney, Agent, or Firm — Buchanan Ingersoll & Rooney, PC

(57) ABSTRACT

A process for hydrotreating recycled or renewable feedstocks with a catalytic microparticle slurry, and a process for manufacturing the catalytic microparticle slurry, are disclosed.

18 Claims, 10 Drawing Sheets

(51) Int. Cl.
  *B01J 35/23* (2024.01)
  *B01J 35/30* (2024.01)
  *B01J 37/20* (2006.01)
  *C10G 1/08* (2006.01)
  *C10G 1/10* (2006.01)
  *C10G 45/04* (2006.01)
  *C10G 45/16* (2006.01)

(52) U.S. Cl.
  CPC ............. *B01J 37/20* (2013.01); *C10G 1/086* (2013.01); *C10G 1/10* (2013.01); *C10G 3/50* (2013.01); *C10G 45/04* (2013.01); *C10G 45/16* (2013.01); *C10G 2300/1003* (2013.01); *C10G 2300/1014* (2013.01); *C10G 2300/202* (2013.01); *C10G 2300/301* (2013.01); *C10G 2300/4006* (2013.01); *C10G 2300/4012* (2013.01); *C10G 2300/70* (2013.01)

(58) Field of Classification Search
  CPC ............. C01P 2002/72; C01P 2004/03; C01P 2004/51; C10G 1/086; C10G 1/10; C10G 3/44; C10G 3/46; C10G 3/50; C10G 45/04; C10G 2300/1003; C10G 2300/1014; C10G 2300/202; C10G 2300/301; C10G 2300/4006; C10G 2300/4012; C10G 2300/70; Y02P 30/20
  See application file for complete search history.

(56) References Cited

U.S. PATENT DOCUMENTS

| | | | |
|---|---|---|---|
| 2005/0241993 A1* | 11/2005 | Lott | C10G 49/04 |
| | | | 208/108 |
| 2011/0139677 A1 | 6/2011 | Bellussi et al. | |
| 2013/0248422 A1 | 9/2013 | Qiu et al. | |
| 2019/0270074 A1 | 9/2019 | Mathivet et al. | |

FOREIGN PATENT DOCUMENTS

| | | |
|---|---|---|
| WO | 2013039950 A2 | 3/2013 |
| WO | 2017058783 A1 | 4/2017 |
| WO | 2017058976 A1 | 4/2017 |
| WO | 2017212168 A1 | 12/2017 |

OTHER PUBLICATIONS

Finnish Search Report dated Aug. 24, 2020, issued by the Finnish Patent Office in corresponding Application No. 20196126. (3 pages).
Finnish Search Report dated Mar. 30, 2020, issued by the Finnish Patent Office in corresponding Application No. 20196126. (3 pages).
Grilc et al., "Hydrodeoxygenation of solvolysed lignocellulosic biomass by unsupported MoS2, MoO2, Mo2C and WS2 catalysts", Appli ed Catalysis B: Environmental, vol. 163, Feb. 1, 2015, pp. 467-477, XP055777625.
International Preliminary Report on Patentability (PCT/IPEA/409) issued on Mar. 9, 2022, by the European Patent Office as the International Searching Authority for International Application No. PCT/FI2020/050848.
International Search Report (PCT/ISA/210) and Written Opinion (PCT/ISA/237) mailed on Apr. 30, 2021, by the European Patent Office as the International Searching Authority for International Application No. PCT/FI2020/050848. (17 pages).
Jeong Hyun-Rok et al. "Comparison of unsupported WS2and MoS2catalysts for slurry phase hydrocracking of vacuum residue", Applied Catalysis A: General, vol. 572, Dec. 17, 2018, pp. 90-96, XP085586078.
Yang et al., Catalytic Hydrodeoxygenation of crude bio-oil over an unsupported bimetallic dispersed catalyst in supercritical ethanol. In: Fuel Processing Techonlogy Netherlands: Elsevier BV, Feb. 27, 2016, vol. 148, pp. 19-27.
Yang, et al., Influence of MoS2 catalyst morphology on the hydrodeoxygenationof phenols. In: Catalysis Communications Amsterdam, NL: Elsevier, Jan. 18, 2008, vol. 9, 1364-1368, ISSN 1566-7367.
Kukard et al., "Slurry-Phase Batch Microreactor for Hydroconversion Studies", Energy & Fuels, Aug. 20, 2015, pp. 5274-5281, vol. 29, No. 8.
Office Action (Communication) issued on Aug. 29, 2023, by the European Patent Office in corresponding European Patent Application No. 23154097.2. (5 pages).
First Office Action issued on Mar. 18, 2024, by the Chinese Patent Office in corresponding Chinese Patent Application No. 202080088836.5, and an English Translation of the Office Action. (13 pages).

* cited by examiner

CATALYTIC HYDROTREATING OF FEEDSTOCKS

TECHNICAL FIELD

The present disclosure concerns a novel hydrotreatment catalyst and a hydrotreatment process for hydrotreating carbonaceous feedstocks, in particular carbonaceous feedstocks that contain heteroatoms such as oxygen, sulphur and/or nitrogen.

BACKGROUND

A challenge in hydrotreatment of liquid carbonaceous feedstocks, such as liquid lignocellulose derived feedstocks, compared to fossil crude oil based feedstocks is oxygen removal and hydrocracking of high molecular weight components that are often lignin based. Further, recycled liquefied polymer waste contains other impurities that may block catalysts commonly used in hydrotreatment. Formation of polycyclic aromatic hydrocarbons (coke) during hydrotreatment should be avoided as these compounds may cause deactivation of the hydrotreatment catalyst, and fouling of the reactor and heat exchangers in the process unit. Coke formation can be a thermally induced or an acid catalyzed reaction where aromatic structures are formed by cyclization and dehydrogenation. Small polyaromatic hydrocarbons, like naphthalenes (2-ring) and phenanthrenes (3-ring) can act as precursors to coke formation by condensation to larger polyaromatic compounds.

WO2017058783 discloses a process for hydroconversion of heavy hydrocarbon crude oil with a catalyst comprised of iron, molybdenum, and particulate carbon. A similar process is disclosed in WO2017058976. Both disclosures carry out hydrotreatment in temperatures above 400° C. that are not suitable for oxygen-containing feedstocks from renewable sources.

U.S. Pat. No. 8,022,259 discloses a process for hydroconversion of a co-feed of fossil petroleum and particulate biomass to improve aromaticity of the resulting product.

The present disclosure concerns catalytic hydrocracking of oxygen-containing feedstocks. The hydrocracking catalyst of the present disclosure is useful in particular when hydrocracking renewable feedstocks that contain oxygen and high molecular weight components.

SUMMARY

According to the first aspect is provided a hydrotreatment process comprising:
 a. providing in a reactor a liquid feedstock;
 b. hydrotreating the liquid feedstock in liquid phase and at a temperature selected from the range 280-380° C. in the presence of catalytic $MoS_2$ microparticle slurry to provide a liquid reaction product with decreased heteroatom content.

With the present process the carbonaceous compounds of the feedstock are advantageously hydrotreated, and high molecular weight compounds are split into smaller fragments, while coke formation can be avoided. Simultaneously heteroatoms, such as oxygen, sulphur and/or nitrogen can be at least partially removed from the carbonaceous material.

According to the second aspect is provided a process for manufacturing catalytic molybdenum sulphide microparticles comprising:
 a. providing in a hydrocarbon solvent a Mo precursor and a $H_2S$ source to provide a reaction mixture;
 b. hydrogenating under vigorous stirring the reaction mixture at a temperature of at least 180° C., such that the combination of temperature and pressure is sufficient for evaporating water in the reaction mixture.

The manufactured microparticles are advantageous in having a size in micrometer scale, which allows providing them with hydrocarbons in a slurry when used as a hydrotreatment catalyst. The particles may have an at least partially crystalline structure. The particles disperse readily in hydrocarbons and in liquid carbonaceous feedstocks, and have a large accessible surface area which makes them effective when used as a catalyst in hydrotreating of oxygen-containing feedstocks, and allows performing hydrotreatment and oxygen, nitrogen and sulphur removal from heavier compounds than with catalysts previously used and that are typically used for hydrotreating fossil feedstocks.

For selecting a suitable combination of pressure and temperature such that water evaporates during manufacturing of the catalytic microparticles, the skilled person can easily found suitable conditions from a phase diagram of water.

The present hydrotreatment process is also advantageous in that, by using the present catalytic microparticle slurry, it achieves high hydrotreatment activity which promotes hydrocracking reaction and the conversion of coke precursors into stable products rather than to coke. The accessibility of large lignin components and coke precursors to the active sites of the catalysts is facilitated in the present catalyst micro particles, compared to porous catalyst particles in pellet or extrudate form.

In an embodiment the catalytic molybdenum sulphide microparticles of the second aspect are used in the process of the first aspect.

DETAILED DESCRIPTION

Figure 1:
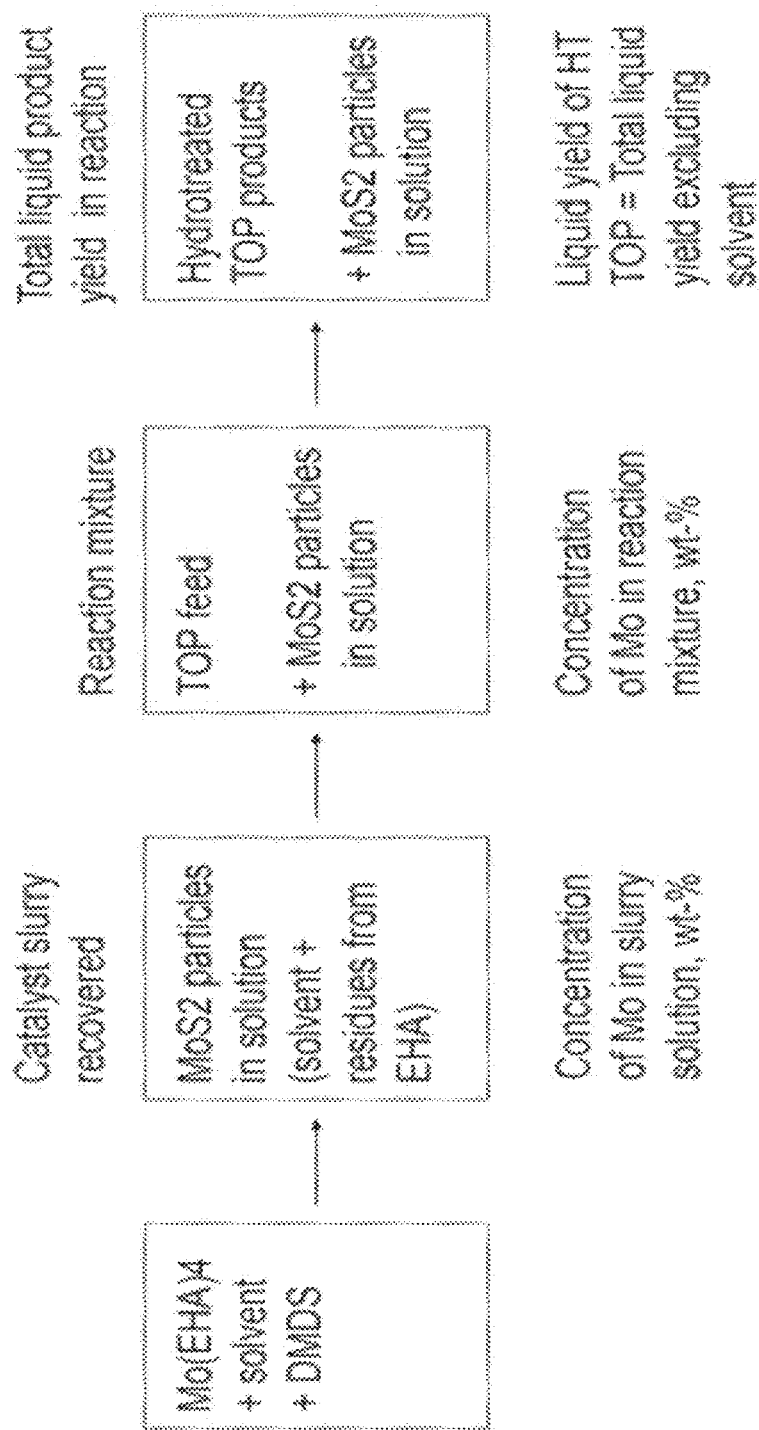
FIG. 1 shows an outline of the Examples for preparation of $MoS_2$ particles and the hydrotreatment process.

In an embodiment the feedstock, or the oxygen-containing feedstock, is derived or manufactured from renewable material which may also be recycled material. Components or compositions derived from renewable (bio-based) materials have a higher content of $^{14}C$ isotopes than corresponding components or compositions derived from fossil (fossil based) sources. Said higher content of $^{14}C$ isotopes in the renewable material of the feedstock is an inherent feature of renewable components or compositions, and it distinguishes the renewable material from fossil materials. Thus, the carbon atoms of renewable materials comprise a higher number of $^{14}C$ isotopes compared to carbon atoms of fossil materials. The isotope ratio of renewable carbon does not change in the course of chemical reactions and, consequently, the origin of the carbon can be analysed from products that are chemically synthesized or catalytically converted from renewable material. It is thus possible to distinguish between a carbonaceous compound or composition derived from renewable sources, and a similar carbonaceous compound or composition derived from fossil sources by analysing their $^{12}C$ and $^{14}C$ isotope content. The $^{14}C$ isotope content can be measured and quantified by standard methods, such as ASTM D 6866 or DIN 51637. Typically, in a component or composition derived completely from renewable sources the measured $^{14}C$ content of the total carbon content is 100% (±measurement accuracy). The amount of renewable carbon in the composition can thus be quantified based on the carbon isotope isotope profile, and be used to determine the nature and origin of its components. The nature and origin of feedstocks and products manufactured in the present processes can thus be confirmed and distinguished by carbon isotope analysis. Thus, a product manufactured with the present process from renewable feedstock has a $^{14}C$ content which corresponds to the portion of renewable feedstock in the product. When a fully renewable feedstock is used as a feedstock, the resulting reaction product has a $^{14}C$ content of about 100%.

The term "polymer waste" refers to an organic polymer material which is no longer fit for its use or which has been disposed of for any other reason. Polymer waste may specifically be solid and/or liquid polymer material and is (or comprises) usually solid polymer material. Polymer waste more specifically may refer to end life tires, collected consumer plastics (consumer plastics referring to any organic polymer material in consumer goods, even if not having "plastic" properties as such), and/or collected industrial polymer waste. In the sense of the present invention, the term "polymer waste" or "polymer" in general does not encompass purely inorganic materials (which are otherwise sometimes referred to as inorganic polymers). Polymers in the polymer waste may be of natural and/or synthetic origin and may be based on renewable and/or fossil raw material.

The term "liquefied polymer waste" refers to an oil or an oil-like product obtainable from liquefaction, i.e. non-oxidative thermal of thermocatalytic depolymerization of polymer waste. The method of liquefaction is not particularly limited and one may mention pyrolysis (such as fast pyrolysis) of polymer waste, or hydrothermal liquefaction of polymer waste.

In an embodiment the feedstock is, or comprises, recycled liquefied polymer waste. Liquefied polymer waste contains impurities such as sulfur, nitrogen, and halogens (Cl, Br), and they typically concentrate on the heaviest fraction of the liquefied polymer waste. When such feed is hydrotreated, solid catalysts of fixed bed reactors are easily deactivated because of the impurities. The catalysts used in fixed bed reactors are also easily coked because of the high temperature required to keep the feedstock in a liquid phase.

In an embodiment the feedstock is, or comprises, crude liquefied polymer waste, a distilled fraction of liquefied polymer waste, the heaviest fraction of liquefied polymer waste, or another liquefied polymer waste fraction. After hydrotreatment the obtained product can be processed further e.g. by hydrocracking, hydroisomerisation and/or fluid catalytic cracking, which is particularly useful when processing heavy liquefied polymer waste feedstocks.

In an embodiment the present hydrotreatment process is carried out using liquefied polymer waste as the feedstock and in a temperature wherein the feedstock remains in liquid phase.

In an embodiment the liquefied polymer waste comprises material from colored, multimaterial, multilayer packaging waste. In another embodiment the feedstock does not contain virgin polymer material.

In an embodiment the feedstock is not, or does not comprise, hydrocarbons, such as fossil hydrocarbons. Origin of the carbonaceous material present in the feedstock can be verified by $^{14}C$ analysis. Thus, by selecting fully renewable feedstock material, the resulting hydrotreated product is also renewable.

In an embodiment the present process removes at least one of halogen, sulfur, nitrogen, silicon, chlorine, bromine. The present process is particularly effective when using liquefied polymer waste or recycled polymer waste that may contain said impurities. The present process is thus able to effectively combine a pretreatment and a hydrotreatment step in a one-step process.

In an embodiment the feedstock contains oxygen-containing compounds. The oxygen-containing compounds of the feedstock are primarily composed of carbon and hydrogen and contain at least oxygen as a heteroatom. In addition to oxygen, the compounds of the feedstock can contain further heteroatoms such as nitrogen and sulphur.

In an embodiment the feedstock has a density of at least 900 $m^3/kg$ at 50° C. (ENISO12185).

In an embodiment tall oil pitch is provided as the feedstock.

In an embodiment the oxygen-containing feedstock contains at least 10 wt-% compounds that have a molecular weight of at least 500 g/mol. In another embodiment the oxygen-containing feedstock contains at least 60 wt-% compounds that have a molecular weight of at least 500 g/mol. In yet another embodiment the oxygen-containing feedstock contains 10-20 wt-% compounds that have a molecular weight of at least 500 g/mol. Such high molecular weight components are at least partially split into lighter components during the present hydrotreatment process. The amount of said high molecular weight compounds can be analysed for example by high-resolution mass spectroscopy and gel permeation chromatography, GPC.

In an embodiment the feedstock to be hydrotreated does not contain heavy crude oil-based components, such as hydrocarbons having a boiling point above 565° C.

In an embodiment the boiling point refers to a boiling point at atmospheric pressure.

Examples of renewable feedstocks according to invention are lignocellulose derived feedstocks for biofuel production, such as liquid crude tall oil (CTO), tall oil pitch (TOP), crude fatty acid (CFA), tall oil fatty acids (TOFA) and distilled tall oil (DTO), liquefied lignocellulosic biomass, such as biocrudes as well as bio-oils obtained by various liquefaction techniques, such as fast pyrolysis (FP) or/and catalytic fast pyrolysis (CFP), and polymer waste. Any combination of said renewable feedstocks can also be used.

In an embodiment the term "fast pyrolysis" refers to thermochemical decomposition of biomass through rapid heating in absence of oxygen.

In an embodiment the term "hydrothermal liquefaction" (HTL) refer to a thermal depolymerization process used to convert wet biomass into crude-like oil under moderate temperature and high pressure.

Crude tall oil (CTO) is a generic term that applies to a complex mixture of tall oil fatty and resin acids most frequently obtained from the acidulation of crude tall oil soap via Kraft or sulfite pulping processes. Crude tall oil (CTO) comprises resin acids, fatty acids, and unsaponifiables. Resin acids are diterpene carboxylic acids found mainly in softwoods and typically derived from oxidation and polymerization reactions of terpenes. The main resin acid in crude tall oil is abietic acid but abietic derivatives and other acids, such as pimaric acid are also found. Fatty acids are long chain monocarboxylic acids and are found in hardwoods and soft-woods. The main fatty acids in crude tall oil are oleic, linoleic and palmitic acids. Unsaponifiables cannot be turned into soaps as they are neutral compounds which do not react with sodium hydroxide to form salts. They include sterols, higher alcohols and hydrocarbons. Sterols are steroids derivatives which also include a hydroxyl group.

The term "tall oil pitch (TOP)" refers to residual bottom fraction from crude tall oil (CTO) distillation processes. Tall oil pitch typically comprises from 34 to 51 wt-% free acids, from 23 to 37 wt-% esterified acids, and from 25 to 34 wt-% unsaponifiable neutral compounds of the total weight of the tall oil pitch. The free acids are typically selected from a group consisting of dehydroabietic acid, abietic, other resin acids and free fatty acids. The esterified acids are typically selected from a group consisting of oleic and linoleic acids. The unsaponifiables neutral compounds are typically selected from a group consisting of triterpene sterols, fatty alcohols, sterols, and dehydrated sterols.

The term "crude fatty acid (CFA)" refers to fatty acid-containing materials obtainable by fractionation (e.g., distillation under reduced pressure, extraction, and/or crystallization) of CTO. Crude fatty acid (CFA) can also be defined as combination of fatty acids containing fractions of crude tall oil distillation i.e. tall oil heads (TOH), tall oil fatty acid (TOFA) and distilled tall oil (DTO).

The term "tall oil heads (TOH)" refers to the most volatile neutrals and fatty acids from crude tall oil (CTO) distillation processes.

The term "tall oil fatty acid (TOFA)" refers to fatty acid rich fraction of crude tall oil (CTO) distillation processes. TOFA typically comprises mainly fatty acids, typically at least 80 wt % of the total weight of the TOFA. Typically TOFA comprises less than 10 wt % resin acids.

The term "distilled tall oil (DTO)" refers to a complex mixture of mainly fatty acids and resin acids fraction of crude tall oil (CTO) distillation processes. DTO typically comprises mainly fatty acids, typically from 55 to 90 wt %, and resin acids, typically from 10 to 40 wt % resin acids, of the total weight of the DTO. Typically DTO comprises less than 10 wt % unsaponifiable neutral compounds of the total weight of the distilled tall oil.

The term "bio-oil" refers to pyrolysis oils produced from biomass by employing pyrolysis.

The term "biocrude" refers to oils produced from biomass by employing hydrothermal liquefaction.

The term "biomass" refers to material derived from recently living organisms, which includes plants, animals and their byproducts.

The term "lignocellulosic biomass" refers to biomass derived from plants or their byproducts. Lignocellulosic biomass is composed of carbohydrate polymers (cellulose, hemicellulose) and an aromatic polymer (lignin).

The term "liquefied lignocellulosic biomass" refers to biocrudes as well as bio-oils obtained by various liquefaction techniques, such as hydrothermal liquefaction" (HTL), fast pyrolysis (FP) and catalytic fast pyrolysis (CFP)

The term "pyrolysis" refers to thermal decomposition of materials at elevated temperatures in a non-oxidative atmosphere.

The term "fast pyrolysis" refers to thermochemical decomposition of biomass through rapid heating in absence of oxygen.

The term "hydrothermal liquefaction" (HTL) refers to a thermal depolymerization process used to convert wet biomass into crude-like oil under moderate temperature and high pressure.

Examples of bio-oil and biocrude produced from lignocellulosic biomass, e.g. materials like forest harvesting residues or byproducts of a saw mill, are lignocellulosic pyrolysis liquid (LPL), produced by employing fast pyrolysis, and HTL-biocrude, produced by employing hydrothermal liquefaction.

The amount of oxygen in the renewable feedstocks may vary depending on the material, and is generally as follows: CTO/TOP ~10 wt-%, HTL 5-15 wt-%, CFP 15-20 wt-% and FP 35-40 wt-%. The amount of oxygen and the type of oxygen-containing compounds have an effect on physical properties of the feedstock such as thermal stability, total acid number (TAN), density, and volatility. For example, TAN values for these types of lignocellulose derived feedstocks can easily be in the range of 10-200 mg KOH/g due to the variability in both oxygen amount and type of oxygenates. With the present catalyst oxygen containing feedstocks that have high molecular weight could advantageously be hydrotreated without significant coke formation.

When using liquefied polymer waste as the feedstock the oxygen content of the feedstock is typically lower than with e.g. lignocellulosic material. For a feedstock fully containing liquefied polymer waste, the oxygen content may be less than 5 wt-%, below 3 wt-% or below 2 wt-% or below 1 wt-%.

In an embodiment liquefied polymer waste is manufactured from recycled polymer waste which may be quite variable in its consistency and quality because of the many grades and types of polymers on the market. In an embodiment liquefied polymer waste may contain polyolefins that can be liquefied in a temperature below 450° C. Preferably the process temperature during hydrotreatment is selected such that no significant thermal cracking occurs during the hydrotreatment.

The renewable feedstocks may contain high molecular weight lignin components. Additionally, in the case of CTO and TOP, also other types of high molecular weight components such as sterol esters of fatty/resin acids are typically present. Due to these oxygen-containing heavy compounds the density of the feedstocks can generally be considered to be >900 m$^3$/kg at 50° C. (ENISO12185).

Renewable feedstocks, such as TOP, contain long-chain esters, fatty acids and resin acids as well as some lignin components, but no cellulose/hemicellulose derived compounds. Thus, in one embodiment of the invention the feedstock does not contain cellulose and/or hemicellulose. TOP may comprise ~13% free resin acids, ~3~8% free fatty acids, only ~1% free sterols and ~12% bound sterols, ~60% fatty acid esters and fatty acid esters of wood alcohols. In addition, TOP comprises lignin, the molecular weight of which is generally >1000 g/mol, and dimers, and oligomers of resin acids.

Bio-oils formed from liquefaction of lignocellulosic biomass contain mainly components derived from cellulose, hemicellulose and lignin. Such materials can be hydrotreated in the present process. Bio-oils thus often contain higher amounts of lignin compared to CTO/TOP. Also more different types of oxygen-containing compounds may be present in bio-oils, such as phenols, furans, alcohols, acids, ethers, aldehydes and ketones.

The term slurry means a semi-liquid mixture. In the present catalytic microparticle slurry the catalytic microparticles are dispersed in a liquid medium, typically in a hydrocarbon. The catalytic microparticle slurry of the present invention may appear visually as a liquid because of the small size of the microparticles. However, presence of the catalytic microparticles can be verified by microscopic analysis.

With the present hydrotreatment process involving use of catalyst slurry it is possible to achieve nearly isothermal operation, easy control of temperature, high conversion rate, and operational flexibility.

There are several techniques for separation of catalyst particles from the product, such as by using filters, settling devices, by magnetic separation and by using hydrocyclones.

In an embodiment the catalyst is unsupported. Advantageously the present catalyst can be provided substantially without a catalyst support, whereby the exposed surface area of the catalyst is increased in comparison to a providing the catalyst on a support, such as silica or alumina. In an embodiment at least 90% of the catalytic MoS$_2$ microparticles have a size below 7 μm. The size of the microparticle is defined as the average of the length (longest dimension) and width (shortest dimension) of the particle. In another embodiment at least 75% of the catalyst particles have a size below 4 μm. In another embodiment the size of the particles is as disclosed in Table 4. The dimensions of the microparticles can be determined by methods used in the art to analyse particles in the micrometer range, such as by scanning electron microscopy (SEM).

In an embodiment at least 90% of the microparticles have an aspect ratio of 0.40-1.0 as analysed from SEM micrographs.

In an embodiment the distribution of the aspect ratios of the microparticles is such that at least 90% have an aspect ratio in the range 0.40-1.0 μm/μm, at least 80% have an aspect ratio in the range 0.50-1.0 μm/μm and at least 65% have an aspect ratio in the range 0.60-1.0 μm/μm. In another embodiment 94% of the microparticle have an aspect ratio within the range 0.40-1.0, 84% within 0.50-1.0 and 69% within 0.60-1.0. The aspect ratio is expresses as the ratio between the width and the length of the microparticle. The dimensions of the particles can easily be measured e.g. from SEM micrographs.

In an embodiment the MoS$_2$ particles have at least partially crystalline structure. In an embodiment the crystallinity is at least 10%, at least 15%, at least 20% or at least 30%. For catalytic efficiency it may be advantageous to have partially non-crystalline catalyst. The degree of crystallinity can be determined by X-ray diffraction analysis.

In an embodiment the Mo precursor is a molybdenum salt which is soluble in hydrocarbon. The molybdenum salt preferably comprises a plurality of cationic molybdenum atoms and a plurality of carboxylate anions having at least 8 carbon atoms and that are at least one of (a) aromatic, (b) alicyclic, or (c) branched, unsaturated and aliphatic. More preferably, each carboxylate anion has between 8 and 17 carbon atoms, and most preferably between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In an embodiment the molybdenum salt comprises a plurality of cationic molybdenum atoms and a plurality of carboxylate anions selected from 10-undecenoate, dodecanoate, and combinations thereof. Examples of carboxylate anions that fit at least one of the foregoing categories include carboxylate anions derived from carboxylic acids selected from the group consisting of 10-undecenoic acid, dodecanoic acid, and combinations thereof.

In a preferred embodiment the molybdenum salt comprises a plurality of cationic molybdenum atoms and a plurality of carboxylate anions selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability compared to other catalyst precursors known in the art and have comparable or superior oil solubility, which makes them suitable for use in the present process that are designed for treating liquid feedstocks that contain hydrocarbons.

In an embodiment the catalytic microparticles do not contain other metals, such as nickel. Thus, in an embodiment no nickel catalyst or co-catalyst is used or needed in the present hydrotreatment process.

In an embodiment the catalytic microparticles are kept inside the feedstock in the reactor, i.e. within the liquid phase. This is advantageous to ensure that in the catalytic conversion the feedstock is reacted with the hydrogen dissolved in the feedstock, and no catalytic reactions occur in a gas phase.

In an embodiment no solid feedstock, solid source of hydrocarbons, or another co-feed is provided in the reactor. Thus, the feedstock is preferably a liquid feedstock, preferably a single-phase feedstock. Preferably the feedstock itself is not a slurry of carbonaceous materials in more than one phases.

In an embodiment the liquid feedstock is a non-solid feedstock.

The term "non-solid feedstock" refers to a feedstock that is in liquid form but may contain up 30 to 10000 ppmw (parts per million by weight) solids.

In an embodiment the amount of aromatic compounds does not increase during the hydrotreating step. In an embodiment the aromaticity remains unchanged during hydrotreating.

In an embodiment no fossil hydrocarbons and/or fossil feedstocks are provided, or fed, in the reactor.

In an embodiment the catalytic microparticle slurry is fed into the reactor with a liquid hydrocarbon. The liquid hydrocarbon which carries the microparticles is preferably a middle distillate having a maximum boiling point in the range 180-420° C. In another embodiment the liquid hydrocarbon is a distillate having a maximum boiling point in the range 380-565° C. The hydrotreatment conditions may thus be selected such that the liquid hydrocarbon is not cracked, and the hydrotreatment is carried out to components of the liquid feedstock only. In an embodiment the liquid hydrocarbon is renewable.

In an embodiment the catalytic microparticle slurry is manufactured outside the reactor and the slurry is fed into the hydrotreatment reactor. Feeding of the slurry can take place such that the slurry is mixed with the feedstock before entering the reactor, or the slurry can be fed into the reactor via another inline than used for feeding the feedstock.

In an embodiment water and $H_2S$ are removed from the manufactured catalytic microparticle slurry before it enters the hydrotreatment reactor. Removing water is advantageous because water may at least partially prevent formation of molybdenum sulphide.

In an embodiment the catalyst slurry does not contain carbon particles or carbon microparticles. In another embodiment the catalyst slurry is not provided in carbonaceous matrix.

In an embodiment no other catalyst or co-catalyst is used in the hydrotreating, or present in the reactor.

As a $H_2S$ source, or a sulphidation agent, sulphur compounds that decompose to $H_2S$ in the reaction conditions needed to form $MoS_2$ from the Mo precursor used, can as well be used. Suitable $H_2S$ sources for this purpose are for example sulphides, dimethyl sulphide, disulphides, alkyl disulphides, polysulphides, di-tert-dodecyl polysulphide, mercaptans, n-butyl mercaptan. Hydrogen sulphide gas can also be applied.

In an embodiment the $H_2S$ source provides a molar excess of sulphur to molybdenum, such as at least 4 mol S/mol Mo, at least 5 mol S/mol Mo, at least 6 mol S/mol Mo, at least 7 mol S/mol Mo, or 4-7 mol S/mol Mo, or 5-6 mol S/mol Mo.

As used herein, hydrotreating of the liquid feedstock means contacting the feedstock with hydrogen in the presence of $MoS_2$ microparticles. Hydrotreating saturates unsaturated carbon-carbon bonds of the feedstock and removes heteroatoms such as oxygen, sulfur, and nitrogen from heteroatomic compounds present in the feedstock.

In an embodiment, in the present hydrotreatment process high molecular weight compounds of the feedstock are at least partially broken into lower molecular weight compounds, or fragments. This is advantageous because e.g. lignin and other very high molecular weight compounds can be degraded from the feedstock.

When synthesizing the catalyst slurry, methane, $H_2S$, water, and some of the hydrogenated ligands from the Mo-complex leave the synthesis reactor in the gas phase with the hydrogen flow. The reaction product contains hydrocarbon solvent and hydrogenated derivatives from the ethylhexanoic acid ligands in the molybdenum precursor. The main parameter is the concentration of Mo in the slurry solution and this is calculated based on the recovered amount of catalyst slurry from the preparation.

In an embodiment the hydrotreatment process removes at least 50% of sulphur from the feedstock.

In an embodiment the hydrotreatment process removes at least 50% of oxygen from the feedstock.

In an embodiment the hydrotreatment process removes at least 40% of nitrogen from the feedstock.

The amount of sulphur, oxygen and nitrogen can be analysed by methods known in the art. The amount of sulphur can be expressed as weight-% (wt-%) calculated as elemental S based on the total weight of the liquid oxygen containing feedstock. Similarly, the amount of oxygen can be expressed as weight-% calculated as elemental O based on the total weight of the liquid oxygen-containing feedstock, and the amount of nitrogen can be expressed as weight-% calculated as elemental N based on the total weight of the liquid oxygen-containing feedstock. The content of the sulphur e.g. in the hydrotreatment feed and/or in the bio-based fresh feed, can be calculated as elemental S in accordance with EN ISO 20846.

The TAN value of the product obtained with the present hydrotreatment process is below 5 mg KOH/g.

In an embodiment of the present hydrotreatment process the liquid feedstock contains about 1-40 wt-% oxygen, preferably 5-40 wt-% oxygen.

In an embodiment of the present hydrotreatment process the liquid oxygen-containing feedstock contains at least one of: crude tall oil, tall oil pitch, crude fatty acid, tall oil fatty acid, distilled tall oil, liquefied lignocellulosic biomass such as bio-oil or biocrude, resin acids, TOR, depitched tall oil, neutral constituents of tall oil (tall oil unsaponifiables), liquefied polymer waste, or any combination thereof. Preferably components of the feedstock are soluble with each other to be able to provide a single-phase feedstock. Preferably the feedstock does not contain particulate matter such as lignin or cellulose.

Liquid feedstock, such as an oxygen containing feedstock, means that the feedstock can be transferred into the reactor without an additional solvent e.g. by pumping. For example pure lignin is solid, not liquid, and has to be liquefied with solvents to enable transferring it by pumping.

In an embodiment of the present hydrotreatment process the hydrotreating step is carried out at a temperature selected from the range 320-370° C., preferably from the range 330-360° C.

In an embodiment of the present hydrotreatment process the feedstock contains or is liquefied polymer waste and the temperature is selected from the range 280-320° C., preferably from the range 290-310° C.

In an embodiment of the present process the hydrotreating step is carried out at a pressure selected from the range 70-200 bar such that the liquid feedstock is in liquid phase. In another embodiment the pressure is selected from the range 100-180 bar, more preferably the pressure is selected from the range 120-150 bar.

In another embodiment the feedstock contains liquefied polymer waste and the pressure is selected from the range 70-90 bar, preferably from the range 75-85 bar.

In an embodiment of the present process pressure is controlled by feeding hydrogen gas into the reactor.

In an embodiment of the present process the hydrotreatment removes at least 50% of sulphur, at least 40% of nitrogen, and optionally at least 50% oxygen from the liquid feedstock.

In an embodiment of the present process the catalytic $MoS_2$ microparticles are provided in at least partially crystalline form in the reactor.

In an embodiment of the present process at least 90% the catalytic $MoS_2$ microparticles have a size below 7 μm, wherein the size of a microparticle is expressed as an average of the longest dimension and the shortest dimension of the microparticle.

In an embodiment of the present process the reaction product predominantly contains hydrocarbons having a maximum boiling point of 565° C. at atmospheric pressure.

In an embodiment of the present process the process is carried out in a stirred tank reactor.

In an embodiment of the present manufacturing process for the Mo precursor is selected from molybdenum 2-ethyl hexanoate, carboxylate anion of 3-cyclopentylpropionic acid, cyclohexanebutyric acid, biphenyl-2-carboxylic acid, 4-heptylbenzoic acid, 5-phenylvaleric acid, and geranic acid (3,7-dimethyl-2,6-octadienoic acid). Preferably the Mo precursor is any one of the above compounds.

The amount of Mo precursor may be selected such that its amount is below 5 wt-% in the slurry, such as about 4, 3, 2.5 or 2 wt-%. The amount of Mo (wt-%) may be determined according to the Examples.

In an embodiment of the present manufacturing process the $H_2S$ source is selected from dimethyl disulphide, dimethyl sulphide, disulphide, alkyl disulphide, polysulphide, di-tert-dodecyl polysulphide, mercaptan, n-butyl mercaptan, $H_2S$ gas, and any combination thereof. Preferably the $H_2S$ is any one of the above compound.

In an embodiment the manufacturing process of the catalytic $MoS_2$ particles is carried out in the hydrotreatment process.

In an embodiment of the present hydrotreatment process the $MoS_2$ microparticles are used in an amount 10 ppm-500 ppm, 10-400 ppm, 10-300 ppm, 10-200 ppm, 10-100 ppm, 10-50 ppm or 10-25 ppm based on the total amount (weight) of the reaction mixture in the reactor. In another embodiment the amount of the catalyst particles is 50 ppm-500 ppm, 50-400 ppm, 50-300 ppm, 50-200 ppm or 50-100 ppm based on the total amount of the reaction mixture in the reactor. The amount of microparticle slurry can be calculated as described in the Examples. The above amounts are particularly advantageous when using lignocellulose derived feedstock.

In an embodiment of the present hydrotreatment process the $MoS_2$ microparticle slurry is used in an amount 10 ppm-2 wt-%, 50 ppm-1 wt-%, 100 ppm-1 wt-%, or 200 ppm-5000 ppm, based on the total amount of the reaction mixture in the reactor. The amount of microparticle slurry can be calculated as provided in the Examples. The above amounts are particularly advantageous when using feedstocks derived from lignocellulose.

In another embodiment the feedstock contains, or is, liquefied polymer waste and the $MoS_2$ microparticles are used in an amount 10 ppm-500 ppm, 10-400 ppm, 10-300 ppm, 10-200 ppm, 10-100 ppm, 10-50 ppm or 10-25 ppm based on the total amount of the reaction mixture in the reactor. In another embodiment the feedstock contains or is liquefied polymer waste, and 50 ppm-500 ppm, 50-400 ppm, 50-300 ppm, 50-200 ppm or 50-100 ppm of $MoS_2$ microparticles are used.

In an embodiment of the present hydrotreatment process the reaction product predominantly contains hydrocarbons having a maximum boiling point of 565° C.

In an embodiment of the present hydrotreatment process the reaction product has a total acid number (TAN) below 5 expressed as mg KOH/g reaction product.

In another embodiment the density of the reaction product obtained by the present hydrotreatment decreases compared to the oxygen-containing feedstock before hydrotreatment. The density of the reaction product is at least 60 kg/m³ smaller than the density of the oxygen-containing feedstock.

In an embodiment the process is carried out at an industrial scale.

As used herein, the term "comprising" includes the broader meanings of "including", "containing", and "comprehending", as well as the narrower expressions "consisting of" and "consisting only of".

In an embodiment the process steps are carried out in the sequence identified in any aspect, embodiment or claim. In another embodiment any process step specified to be carried out to a product or intermediate obtained in a preceding process step is carried out directly to said product, i.e. without additional or auxiliary processing step(s) that may chemically or physically alter the product between said two steps.

The appended claims define the scope of protection. Any method, process, product or apparatus disclosed in the description or drawing, and which is not covered by a claim, is provided as an example which is not to be understood as an embodiment of the claimed invention, but which is useful for understanding the claimed invention.

The following clauses are presented:
1. A hydrotreatment process comprising:
   a. providing in a reactor a liquid oxygen-containing feedstock;
   b. hydrotreating the liquid oxygen-containing feedstock in liquid phase and at a temperature selected from the range 320-380° C. in the presence of catalytic MoS2 microparticle slurry, to provide a liquid reaction product with decreased oxygen content.
2. The hydrotreatment process of clause 1, wherein the liquid oxygen-containing feedstock contains about 5-40 wt-% oxygen.
3. The hydrotreatment process of clause 1 or 2, wherein the liquid oxygen-containing feedstock contains at least one of: crude tall oil, tall oil pitch, crude fatty acid, tall oil fatty acid, distilled tall oil, liquefied lignocellulosic biomass such as bio-oil or biocrude, or a combination thereof.
4. The hydrotreatment process of any one of clauses 1-3, wherein the temperature is selected from the range 320-370° C., preferably from the range 330-360° C.
5. The hydrotreatment process of any one of clauses 1-4, wherein the hydrotreating step is carried out at a pressure selected from the range 80-200 bar such that the liquid oxygen-containing feedstock is in liquid phase.
6. The hydrotreatment process of any one of clauses 1-5, wherein the pressure is controlled by feeding hydrogen gas into the reactor.
7. The hydrotreatment process of any one clauses 1-6, wherein the hydrotreatment removes at least 50% of sulphur, at least 40% of nitrogen, and at least 50% of oxygen from the liquid oxygen-containing feedstock.
8. The hydrotreatment process of any one of clauses 1-7, wherein the catalytic MoS2 microparticles are provided in at least partially crystalline form in the reactor.
9. The hydrotreatment process of any one of clauses 1-8, wherein the MoS2 microparticle slurry is used in an amount of 10 ppm-2 wt-%, based on the amount of Mo in the total amount of the reaction mixture in the reactor.

10. The hydrotreatment process of any one of clauses 1-9, wherein at least 90% of the catalytic MoS2 microparticles have a size below 7 μm, and wherein the size of a microparticle is expressed as an average of the longest dimension and the shortest dimension of the microparticle.

11. The hydrotreatment process of any one of clauses 1-10, wherein at least 90% of the particles have an aspect ratio of 0.40-1.0.

12. The hydrotreatment process of any one of clauses 1-11, wherein the reaction product predominantly contains hydrocarbons having a maximum boiling point of 565° C. at atmospheric pressure.

13. The hydrotreatment process of any one of clauses 1-12, wherein the process is carried out in a stirred tank reactor.

14. A process for manufacturing catalytic molybdenum sulphide microparticles comprising:
   a. providing in a hydrocarbon solvent a Mo precursor and a H2S source to provide a reaction mixture;
   b. hydrogenating, under vigorous stirring, the reaction mixture at a temperature of at least 180° C., such that the combination of temperature and pressure is sufficient for evaporating water in the reaction mixture.

15. The process of clause 14, wherein the Mo precursor is selected from molybdenum 2-ethyl hexanoate, carboxylate anion of 3-cyclopentylpropionic acid, cyclohexanebutyric acid, biphenyl-2-carboxylic acid, 4-heptylbenzoic acid, 5-phenylvaleric acid, and geranic acid (3,7-dimethyl-2,6-octadienoic acid).

16. The process of any one of clauses 14-15, wherein the H2S source is selected from dimethyl disulphide, dimethyl sulphide, disulphide, alkyl disulphide, polysulphide, di-tert-dodecyl polysulphide, mercaptan, n-butyl mercaptan, H2S gas, and any combination thereof.

17. The process of any one of clauses 14-16 wherein an amount of H2S source and an amount of Mo precursor is used, which provides a molar excess of sulphur to molybdenum, such as at least 4 mol S/mol Mo, at least 5 mol S/mol Mo, at least 6 mol S/mol Mo, at least 7 mol S/mol Mo, or 4-7 mol S/mol Mo, or 5-6 mol S/mol Mo.

EXAMPLES

The following examples are provided to illustrate various aspects of the present invention. They are not intended to limit the invention, which is defined by the accompanying claims. Molybdenum sulphide ($MoS_2$) particles were prepared in an autoclave using a hydrocarbon mixture (aliphatic hydrocarbons in middle distillate range) as solvent. The metal complex precursor, molybdenum 2-ethyl hexanoate ($Mo(EHA)_4$) was dissolved in the solvent and the sulphidation agent, dimethyl disulphide (DMDS), was added to the solution. This solution was hydrogenated (in $H_2$ flow of 20 l/h) under vigorous stirring at 300° C. and 80 bar to produce small particle size molybdenum sulphide. DMDS was added in large excess (5-6 mol S/mol Mo) to ensure the formation of molybdenum disulphide, $MoS_2$.

The main reactions taking place in the hydrogenating conditions used during the preparation of $MoS_2$ slurry catalyst were (a) decomposition of DMDS to $H_2S$ and $CH_4$ and (a) reduction and sulphidation of molybdenum, (a) $H_3C-S-S-CH_3 + 2\ H_2 = 2\ H_2S + 2\ CH_4$ (b) $Mo(C_8H_{15}O_2)_4 + 2\ H_2S + 12\ H_2 = MoS_2 + 4\ C_8H_{18} + 8\ H_2O$ The concentration of Mo (wt-%) in the recovered catalyst slurry is calculated as follows:

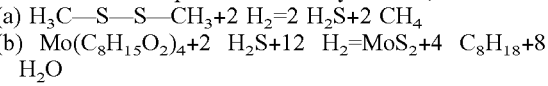

where Mo in $Mo(EHA)_4$ is 14.3 wt-%.

The reagents used in the $MoS_2$ slurry catalyst preparation as well as the recovered amount of catalyst slurry and the concentration of Mo in the slurry solution are shown in Table 1.

TABLE 1

The amount of reagents in the preparation of $MoS_2$ slurry catalysts, the recovered amount of catalyst slurry and the concentration of Mo in the slurry solution.

| Preparation | Solvent, g | DMDS, g | $Mo(EHA)_4$, g | Catalyst slurry recovered, g | Mo in slurry solution, wt-% | Hydrotreatment experiment |
|---|---|---|---|---|---|---|
| 1 | 74.8 | 19.8 | 47.9 | 118.2 | 5.8 | TOPMo1 |
| 2 | 75.3 | 25.0 | 50.0 | 127.0 | 5.6 | TOPMo2, TOPMo3 |
| 3 | 75.2 | 32.2 | 50.1 | 116.7 | 6.2 | TOPMo4, TOPMo5 |
| 4 | 100.3 | 37.0 | 20.8 | 122.5 | 2.4 | TOPMo6 |

In preparations 1-3 similar concentrations of about 6 wt-% Mo were achieved. In preparation 4 a more diluted solution was used giving 2.4 wt-% Mo in the slurry solution. It was found that in a dilute solution smaller $MoS_2$ particles were formed.

For analysis of the fresh $MoS_2$ particles the catalyst slurry was centrifuged to separate the solid $MoS_2$ phase from the solution. The molybdenum and sulphur contents of the $MoS_2$ particles were analyzed by semi-quantitative X-ray fluorescence (XRF) and the particle size studied by scanning electron microscope (SEM).

For the hydrotreatment experiment the $MoS_2$ catalyst slurry was inertly introduced to the autoclave containing the tall oil pitch (TOP) feed. The hydrotreatment reactions were conducted under stirring at temperatures between 320-380° C. at an average hydrogen pressure of 40-50 bar or 105-120 bar for about one day. The reaction was carried out in semi batch mode under flowing hydrogen (flow rate 20 l/h). After the reaction time was reached the reactor was cooled down under stirring. A comparative hydrotreatment experiment with a commercial heterogeneous sulphided $NiMo/Al_2O_3$ catalyst was carried out in a similar experiment by adding the solid catalyst directly into the TOP feed in the autoclave. The $NiMoS/Al_2O_3$ catalyst was manufactured as extrudates to be used in fixed bed reactors. The added amount of TOP feed and catalyst slurry or solid catalyst as well as reaction conditions for the hydrotreatment experiments are shown in Table 2.

The concentration of Mo (wt-%) in the reaction mixture is calculated as follows:

Mo(in reaction),wt-%=[added slurry,g]×[Mo(in slurry),wt-%]/[reaction mixture,g]

TABLE 2

Reaction mixture and conditions in the experiments. MoS$_2$ catalyst slurries were added in TOPMo1-TOPMo6, but solid NiMoS/Al$_2$O$_3$ in the reference experiment TOPNiMo (mark (s) = solid).

| Experiment | T, °C. | p, bar | Time, hours | TOP, g | Catalyst slurry, g | Mo in reaction mixture, wt-% |
|---|---|---|---|---|---|---|
| TOPMo1 | 350 | 121 | 21.1 | 122.5 | 25.2 | 1.0 |
| TOPMo2 | 320 | 48 | 21.0 | 123.2 | 40.7 | 1.4 |
| TOPMo3 | 380 | 110 | 20.7 | 120.0 | 33.1 | 1.2 |
| TOPMo4 | 350 | 40 | 22.9 | 120.0 | 41.9 | 1.6 |
| TOPMo5 | 350 | 114 | 24.7 | 122.0 | 16.2 | 0.7 |
| TOPMo6 | 350 | 104 | 25.5 | 120.0 | 43.8 | 0.7 |
| TOPNiMo | 320 | 48 | 25.2 | 120.0 | 13.3(s) | 1.0 Mo |

MoS$_2$ catalyst slurries containing about 6 wt-% Mo were used in experiments TOPMo1-TOPMo5 and depending on the amount of added catalyst slurry, the final concentration of Mo in the reaction mixture was ≥1.0 wt-% Mo (TOPMo1-TOPMo4) or 0.7 wt-% Mo (TOPMo5). In experiment TOPMo6, a reaction mixture containing 0.7 wt-% Mo was prepared by using the catalyst slurry obtained from the dilute solution containing 2.4 wt-% Mo. TOPMo5 and TOPMo6 have the same Mo-concentration (0.7 wt-%) in the reaction mixture, but the particle size differ due to the different concentrations of Mo precursor during the preparation of the catalyst slurry. The concentration of Mo precursor may also have an effect on the morphology and shape of the catalyst particles. Solid NiMoS/Al$_2$O$_3$ catalyst was added to give 1.0 wt-% Mo in the reaction mixture.

At the end of the experiment a sample containing both liquid product and slurry catalyst was taken from the reactor.

The remaining (main) part of the product was filtered to separate the solid MoS$_2$ particles from the liquid phase. Both unfiltered and filtered samples were analyzed by gel permeation chromatography (GPC) and fourier-transform infrared spectroscopy (FTIR) in order to assure that filtering did not remove any higher molecular weight products together with the solid MoS$_2$ particles since this may distort the more detailed analysis carried out for the filtered product samples (all analysis methods are not suitable for samples containing solid components in liquid phase).

An outline of the Examples for the preparation of MoS$_2$ slurry particles and the hydrotreatment process is shown in FIG. 1.

Results

The molybdenum and sulphur contents and the calculated S/Mo molar ratio of the fresh solid MoS$_2$ particles (separated from the slurry solution) are shown in Table 3.

TABLE 3

Amount of Mo and S, and the molar S/Mo ratio of the precipitate of the slurry MoS$_2$ catalyst.

| Preparation | Mo, wt-% | S, wt-% | S/Mo, mol/mol |
|---|---|---|---|
| 1 | 54.0 | 35 | 1.9 |
| 2 | 43.2 | 33 | 2.3 |
| 3 | 42.8 | 31 | 2.2 |
| 4 | 47.1 | 34 | 2.2 |

Molar S/Mo ratios of about 2 analyzed by the semi-quantitative XRF method for the fresh MoS$_2$ particles confirm the formation of MoS$_2$ from the Mo-complex using DMDS as sulphidation agent in hydrogen atmosphere.

Figure 2:
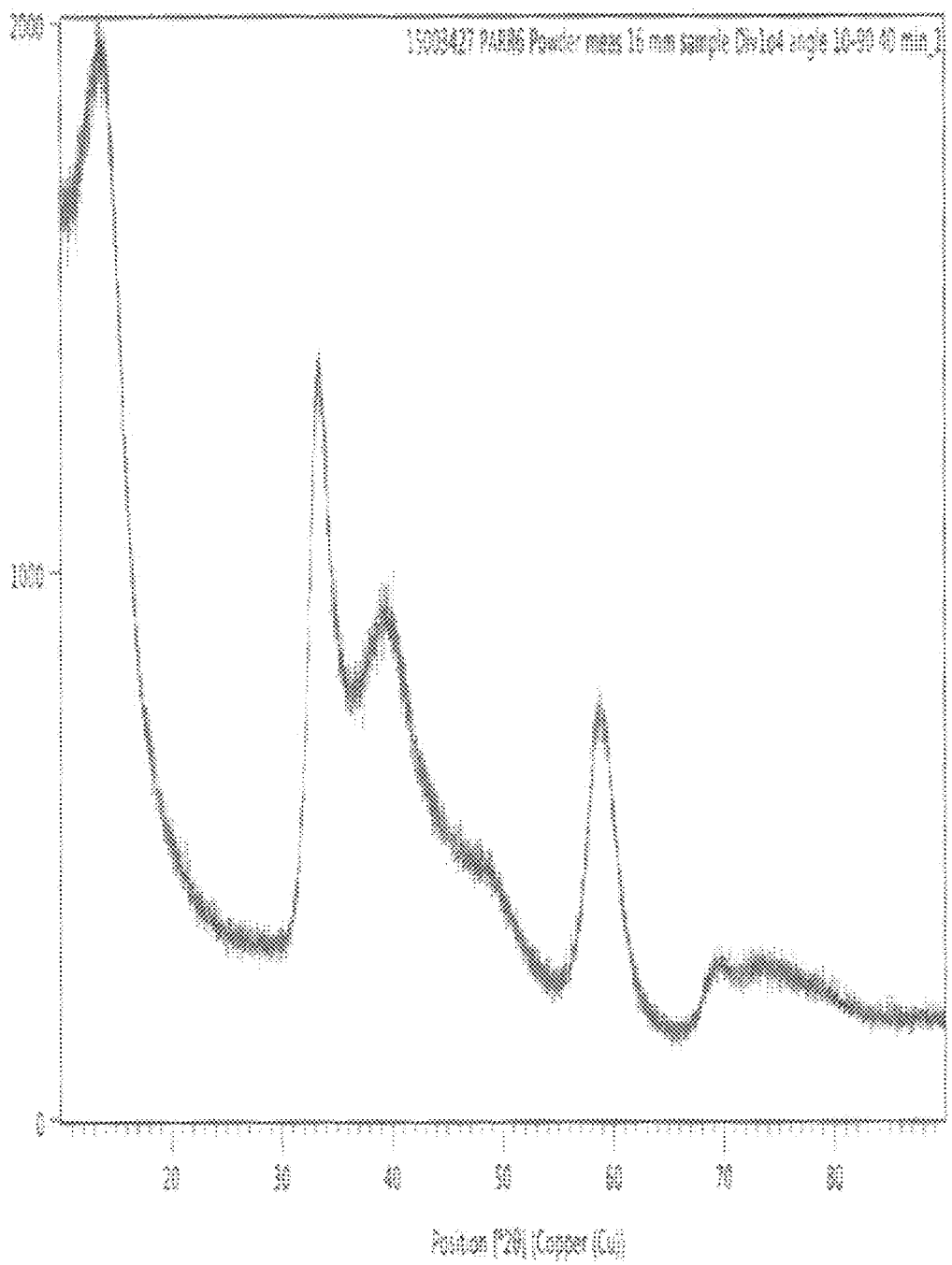
FIG. 2 shows an XRD diffractogram of fresh $MoS_2$ slurry catalyst particles formed from the dilute solution in preparation 4.

FIG. 2 shows the XRD (X-ray powder diffraction) diffractogram of fresh MoS$_2$ particles formed from the dilute slurry solution in preparation 4. The diffractogram corresponds to various crystal phases of molybdenum sulphides. The estimated degree of crystallization is 17% for the manufactured particles.

Figure 3A:
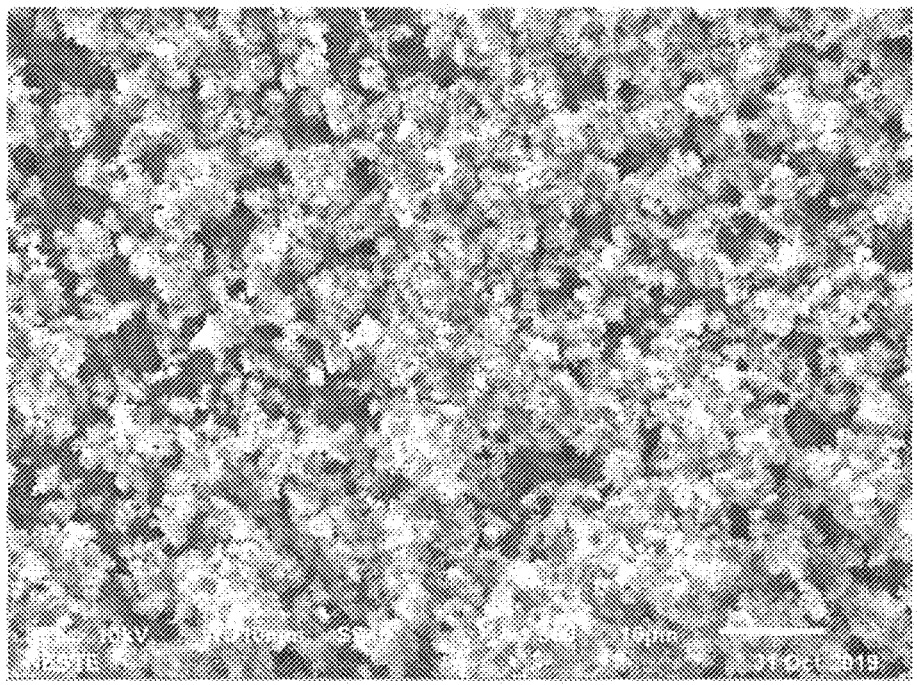
FIGS. 3A and 3B shows SEM-pictures of $MoS_2$ slurry catalyst particles formed from the dilute solution in preparation 4 with (a) ×1 500 and (b) ×8 000 magnifications.
Figure 3B:
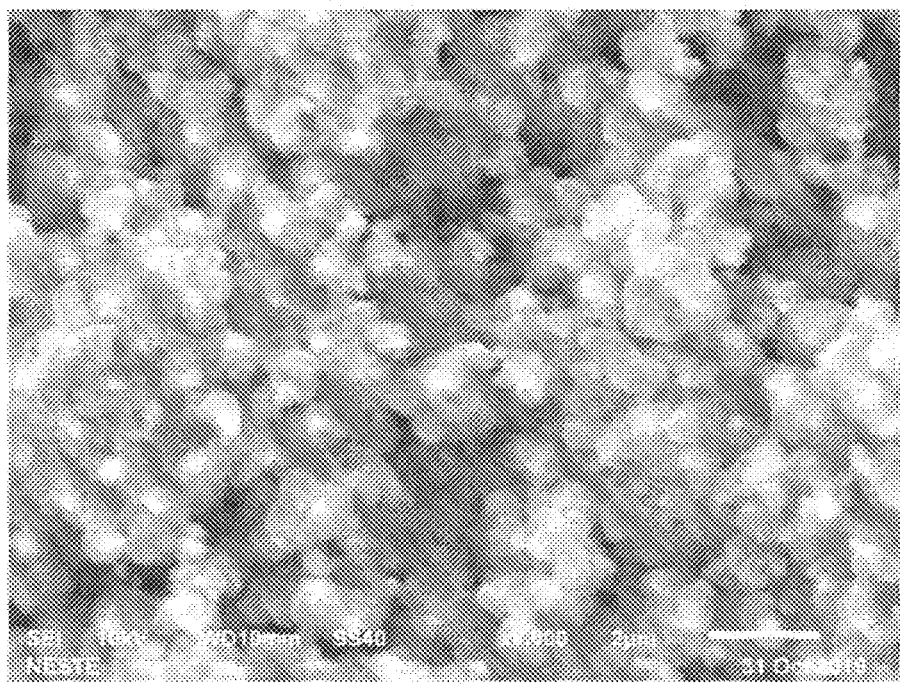

SEM pictures of solid particles from the fresh MoS$_2$ slurry catalyst, formed from the dilute slurry solution in preparation 4, show the variation in particle size and agglomeration at two different magnifications (FIGS. 3A and 3B).

Figure 4:
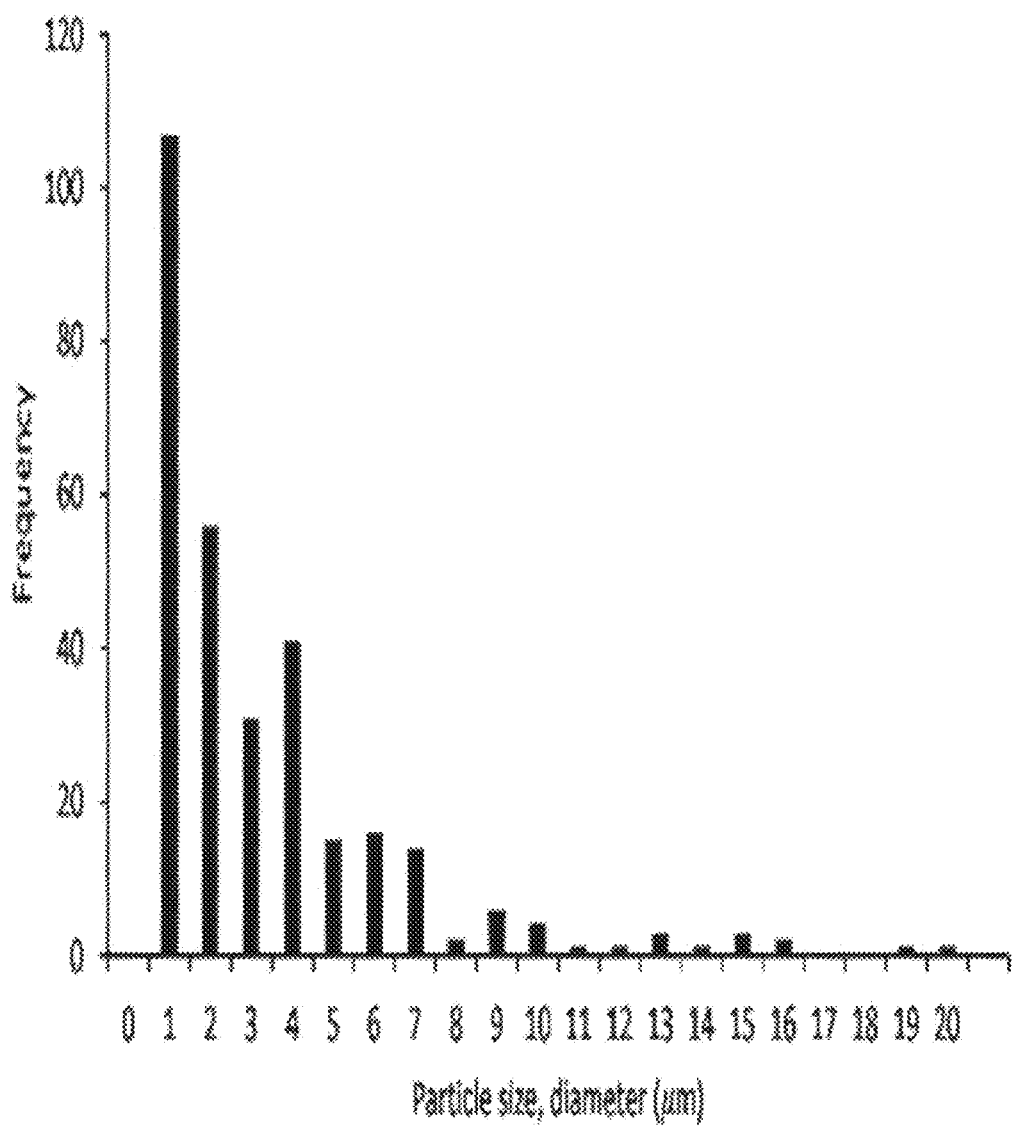
FIG. 4 shows the $MoS_2$ particle size distribution from the dilute solution in preparation 4.

The particle size distribution for the MoS$_2$ slurry catalyst from the dilute solution in preparation 4 was determined by SEM. The powderous sample was dispersed (1 mg/mL) with help of bath sonication (37 kHz, 1 min) at room temperature. In FIG. 4 the particle size distribution and in Table 4 the share of particles of different sizes are shown. The width (shortest dimension) and length (longest dimension) of totally 307 particles were measured and the size of each particle was given as the average of these two values.

The particle size distribution shown in FIG. 4 and Table 4 below is relatively narrow with the main part of the particles within a few micrometers.

TABLE 4

Share of particles below various particle sizes (average of shortest and longest dimension of each particle measured).

| | <1 μm | <2 μm | <3 μm | <4 μm | <5 μm | <6 μm | <7 μm |
|---|---|---|---|---|---|---|---|
| Number of particles | 108 | 162 | 195 | 236 | 251 | 267 | 281 |
| Share | 35% | 53% | 64% | 77% | 82% | 87% | 92% |

In addition, the shape of MoS$_2$ particles was depicted by their width-to-length ratio and the share of particles within various ratios calculated. Accordingly, 94% of the particles were within the ratio of 0.40-1.0 μm/μm, 84% within 0.50-1.0 μm/μm and 69% within 0.60-1.0 μm/μm.

The SEM pictures of solid particles from the fresh MoS$_2$ slurry catalyst, formed from the dilute slurry solution in preparation 4 confirm the formation of particles in the micrometer scale. The distribution of particle size and shape was also homogeneous.

Reaction conditions and product properties analyzed for the hydrotreatment of TOP are shown in Table 5.

TABLE 5

Reaction conditions, and feed and product properties.

| | Reaction conditions | | | Product properties | | | | |
|---|---|---|---|---|---|---|---|---|
| | T, °C | p, bar | Mo, wt-% [1] | Density at 50° C., kg/m³ | O, wt-% | TAN, mgKOH/g | S, ppm | N, ppm |
| TOP feed | | | | 956 | 8.3 | 85 | 2180 | 630 |
| TOPMo2 | 320 | 48 | 1.4 | 844 | 0.7 | 0.7 | 954 | 210 |
| TOPMo4 | 350 | 40 | 1.6 | 835 | <0.2[3] | <0.1 | 78 | 120 |
| TOPMo1 | 350 | 121 | 1.0 | 838 | 0.4[3] | 1.3 | 845 | 220 |
| TOPMo5 | 350 | 114 | 0.7 | 845 | 0.3[3] | 0.2 | 550 | 270 |
| TOPMo6[2] | 350 | 104 | 0.7 | 833 | 0.3 | <0.1 | 340 | 150 |
| TOPMo3 | 380 | 110 | 1.2 | 819 | 0.2 | <0.1 | 156 | 51 |

[1] Amount of Mo in the reaction mixture (TOP + catalyst slurry)
[2] Slurry catalyst used in TOPMo6 was prepared in a more dilute solution (2.4 wt-% Mo in slurry solution) compared to experiments TOPMo1-TOPMo5 (about 6 wt-% Mo in slurry solution)
[3] Oxygen amount given as g/100 ml Following analysis methods were used to determine product properties: density (ENISO12185), oxygen (ASTM D5622), TAN (ISO660), sulphur (ASTM D7039) and nitrogen (ASTM D5762).

The density of the liquid product is mainly influenced by the reaction conditions and conversion of TOP, but it might also to some degree be dependent on the amount of catalyst slurry added (as the density of the slurry solution is lower than that of the hydrotreated TOP product). The oxygen removal from TOP was similar with the $MoS_2$ slurry catalysts regardless of the reaction conditions used. The degree of sulphur and nitrogen removal of TOP are shown in Table 6 when taking into account the liquid yield and excluding the amount of solution added with the $MoS_2$ catalyst slurry to the reaction mixture (by using a correction factor).

The correction factor is calculated as,

Correction factor,%=[Liquid yield,wt-%]/(100−[slurry solution,wt-%])

The degree of heteroatom X (=O, S, N) removal is,

HDX-%=(([X(feed),ppm]−([X(product,ppm]*[CF,%]))/[X(feed),ppm]

TABLE 6

Degree of sulphur (HDS-%) and nitrogen (HDN-%) removal.
LY = liquid yield, CF = correction factor.

| | TOP, g | Slurry, g | Solution in slurry, wt-%[1] | LY, wt-% | CF, % | HDS-% | HDN-% |
|---|---|---|---|---|---|---|---|
| TOPMo2 | 123.2 | 40.7 | 23.4 | 88.0 | 1.17 | 50 | 62 |
| TOPMo4 | 120.0 | 41.9 | 24.2 | 86.2 | 1.16 | 96 | 78 |
| TOPMo1 | 122.5 | 25.2 | 15.9 | 91.4 | 1.10 | 58 | 62 |
| TOPMo5 | 122.0 | 16.2 | 10.9 | 87.6 | 0.99 | 75 | 58 |
| TOPMo6 | 120.0 | 43.8 | 26.0 | 87.3 | 1.19 | 82 | 72 |
| TOPMo3 | 120.0 | 33.1 | 20.3 | 81.1 | 1.03 | 93 | 92 |

[1] The amount of solid $MoS_2$ (0.7-1.6 wt-% Mo) is excluded from the total amount of slurry solution.

The TOP feed contain e.g. long-chain carboxylic acids (fatty acids) and their esters, resin acids and lignin derived oxygen-containing aromatics. Abietic acid, the main resin acid component in TOP, is a potential origin for the formation new polyaromatics if hydrotreatment conditions are not properly controlled. Retene and methyl phenanthrenes are formed from abietic acid by dehydrogenation, in addition to decarboxylation and dealkylation (Scheme 1). These 3-ring aromatic compounds can act as precursors for coke formation, but are also unwanted components in fuel applications.

Scheme 1. Simplified reaction scheme for the conversion of abietic acid into main polyaromatic compounds identified.

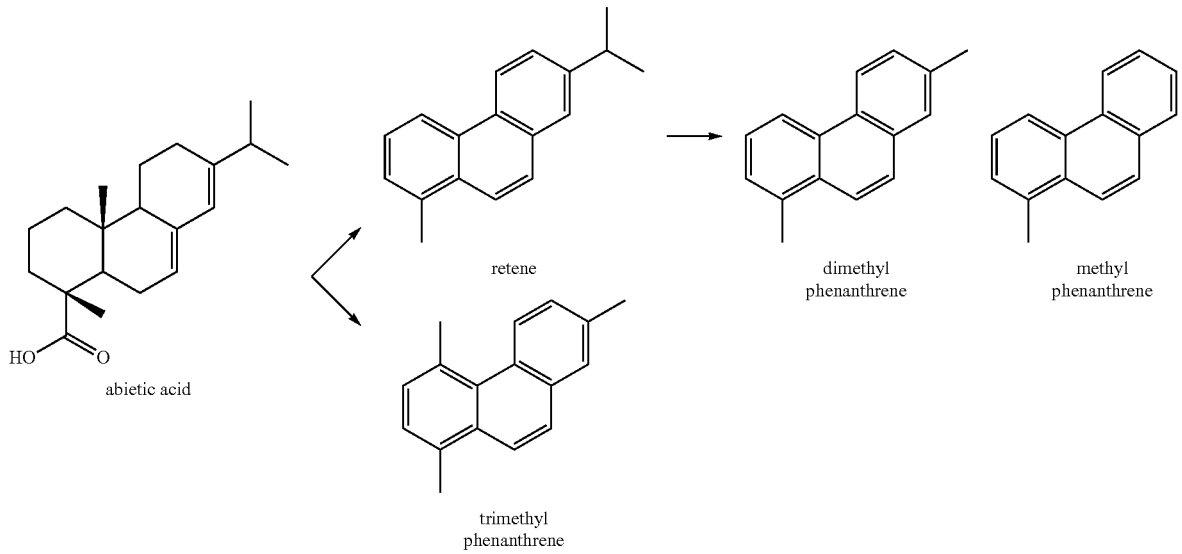

Influence of Reaction Conditions for MoS$_2$ Slurry Catalyst

The samples compared in this example are products from hydrotreatment experiments TOPMo2 (320° C., 50 bar), TOPMo4 (350° C., 40 bar), TOPMo1 (350° C., 120 bar) and TOPMo3 (380° C., 110 bar).

Figure 5:
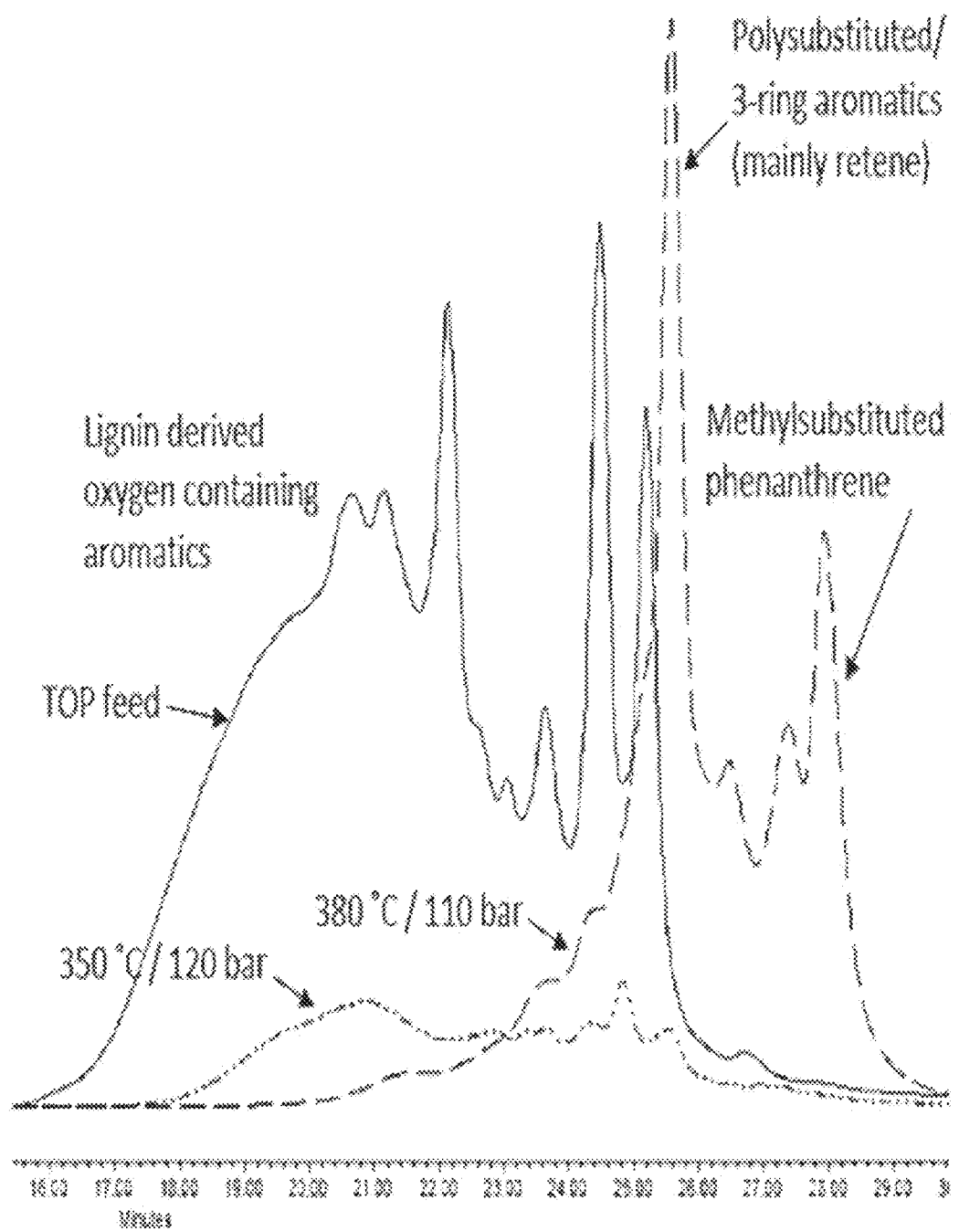
FIG. 5 shows GPC chromatograms for aromatics in TOP hydrotreatment products at various reaction conditions using the $MoS_2$ slurry catalyst.

The influence of reaction conditions was studied with the MoS$_2$ slurry catalysts at two different pressures: at 40-50 bar and 320 and 350° C., and at 105-120 bar and 350 and 380° C. In FIG. 5 GPC chromatograms for aromatics in the products show the efficiency in hydrocracking lignin derived high molecular weight components and the formation of new unwanted polyaromatic compounds. (The heaviest compounds appear to the left of the chromatogram and polyaromatics on the opposite side due to their more compact structure.)

At 320° C. and 50 bar the lowest degree of hydrocracking of high molecular weight lignin derivatives was observed compared to the other conditions used and some retene formation was also observed. At 350° C. and 40 bar an improved hydrocracking of the lignin fraction was obtained, but the formation of coke precursors, like retene and phenanthrene type 3-ring polyaromatics, was highly increased. By increasing the pressure at 350° C. to 120 bar the formation of unwanted polyaromatics was prevented. At 380° C., the high hydrogen pressure was no more able to prevent the formation of polyaromatics and a significantly increased amount of polyaromatics was observed.

FIG. 5 shows the efficient hydrocracking of high molecular weight components and the suppressed formation of polyaromatics at 350° C. and 120 bar compared to the significant formation of polyaromatics at 380° C. and 110 bar.

Figure 6:
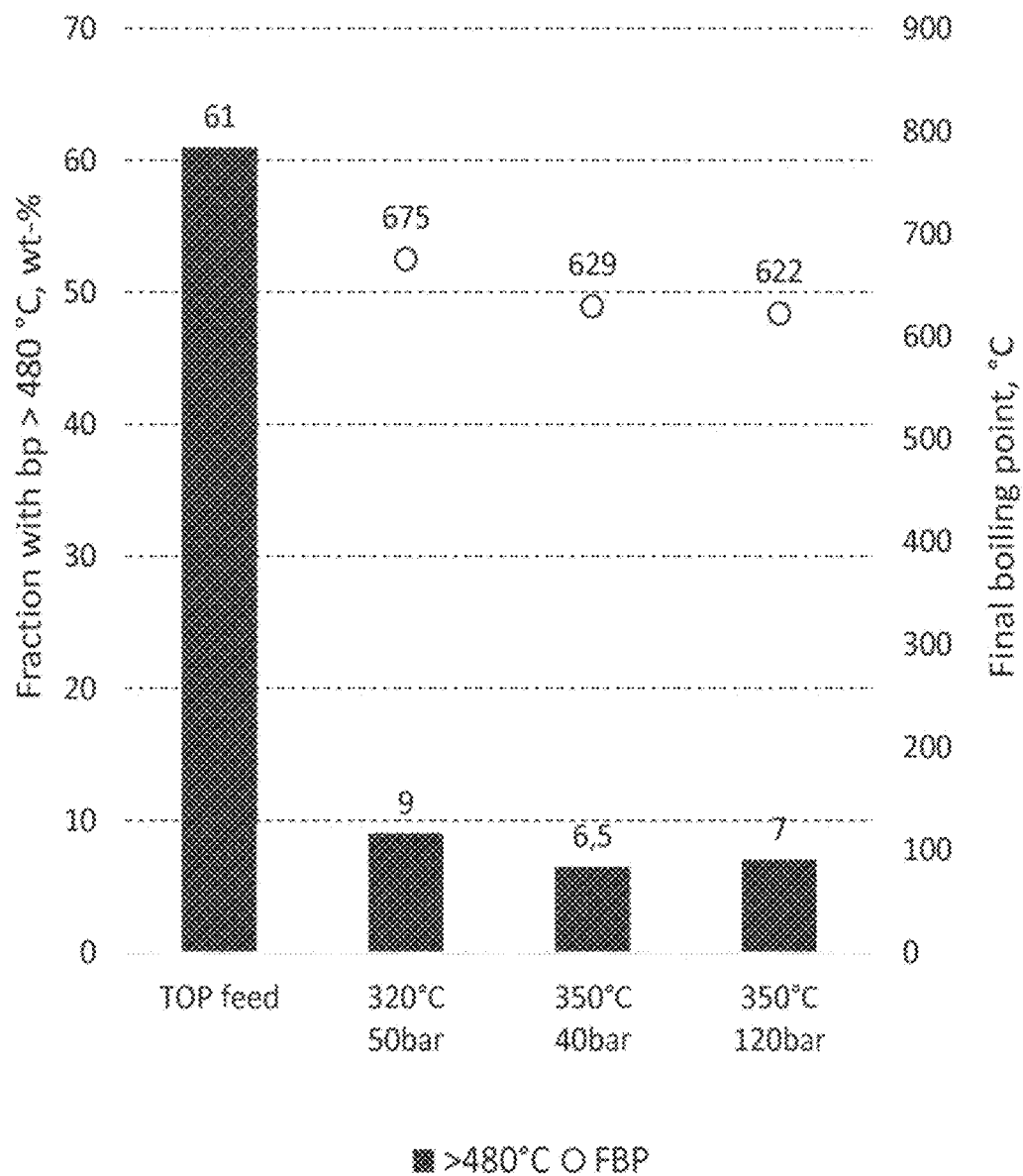
FIG. 6 shows the fraction of TOP hydrotreatment products boiling above 480° C. compared to the feed and final boiling points for the products (at 100 wt-% mass recovery) compared to that of the feed (at 85 wt-% mass recovery).

The high degree of hydrocracking of TOP with the MoS$_2$ slurry catalyst at all reaction conditions tested was also observed in the simulated distillation by gas chromatography (GC) of the liquid products (EN15199-2, SimDist-AC750). FIG. 6 shows the amount of hydrotreated TOP products boiling above 480° C. and the final boiling point for the products (at 100% mass recovery). Full recovery of the TOP feed was not achieved in the simulated distillation by GC due to its low volatility components and only 85 wt-% of the mass was recovered at 699° C.

The fraction boiling above 480° C. decreased from 61 wt-% in TOP feed to <10 wt-% in the hydrotreated TOP products showing the efficient hydrocracking with MoS$_2$ slurry catalysts.

According to the results, an intermediate temperature (320<T<380° C.) and high pressure (>80 bar) is advantageous for obtaining controlled removal of high molecular weight components without (or with minor) formation of polyaromatic compounds. The higher temperatures such as 420-450° C. commonly used for slurry phase hydrocracking of heavy fossil oil are too high for thermally less stable oxygen-containing feedstocks, such as for lignocellulose derived feedstocks. In such high temperatures polyaromatic compounds are easily formed from these feedstocks.

The results shown above proved the efficiency of MoS$_2$ slurry catalysts for hydrocracking. Table 4 further showed that these catalysts were very efficient in oxygen removal with <0.5 wt-% oxygen remaining at hydrotreating temperatures 350° C. The acidity of TOP feed, measured as the total acid number (TAN), was significantly reduced from 85 mg KOH/g in TOP to values in the hydrotreated TOP products clearly below the common requirement of TAN<5 mg KOH/g to minimize the risk of corrosion problems.

Influence of Concentration of Mo Precursor in the Preparation of MoS$_2$ Slurry Catalysts The samples compared in this example are products from hydrotreatment experiments TOPMo5 and TOPMo6, where a concentrated and a dilute solution of the Mo precursor, respectively, was used in the preparation of the catalyst slurry. Similar reaction conditions of 350° C. and 105-115 bar was used in the experiments.

Figure 7:
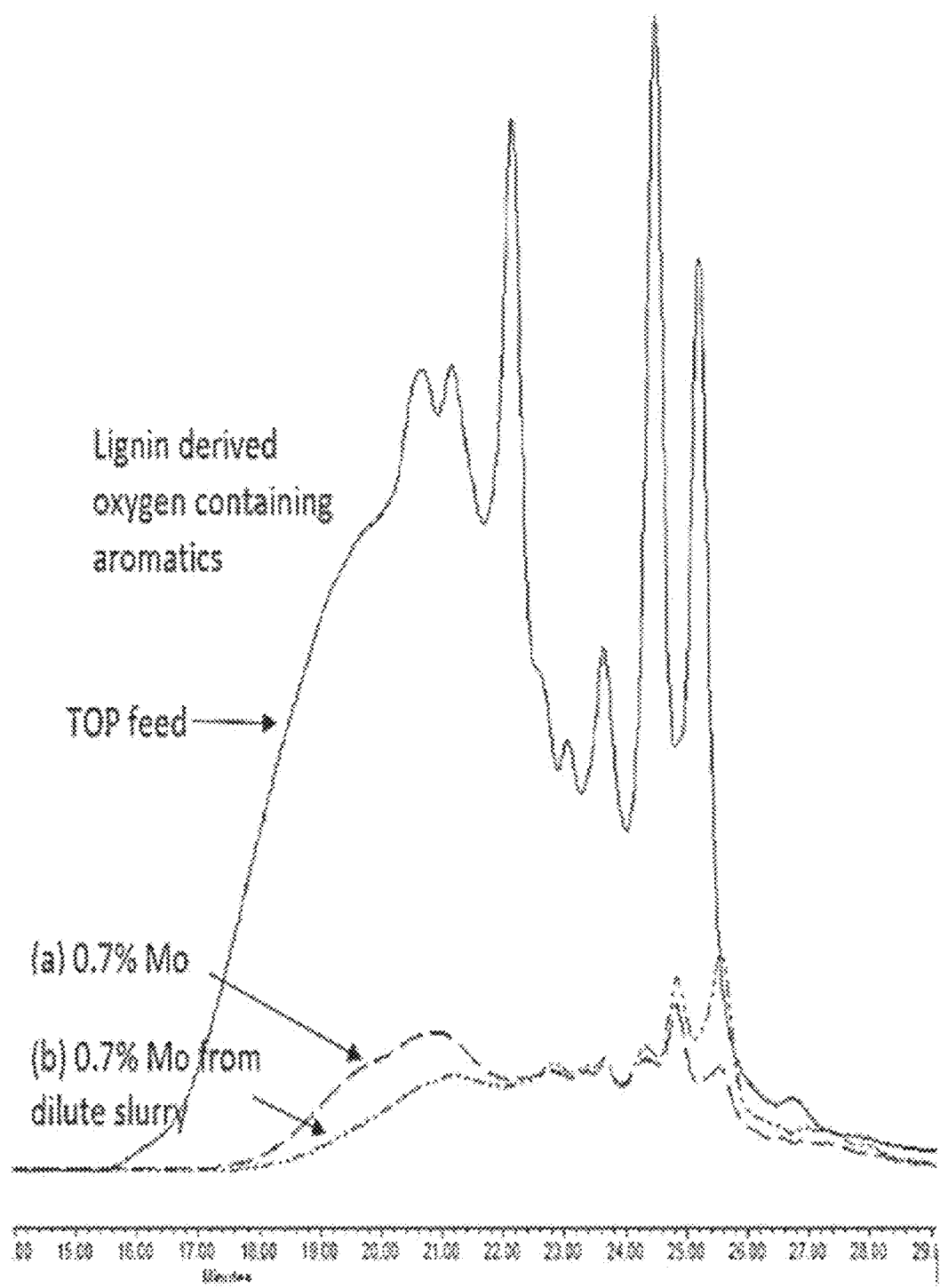
FIG. 7 shows GPC chromatograms for aromatics in TOP hydrotreatment products at 350° C. and 105-115 bar using $MoS_2$ slurry catalysts with 0.7% Mo in the reaction mixture from (a) the concentrated slurry solution and from (b) the dilute slurry solution.

According to GPC chromatograms of aromatics in the products (FIG. 7) the small MoS$_2$ slurry catalyst particles produced from the dilute solution were more efficient in hydrocracking of lignin derived high molecular weight components compared the slurry catalyst prepared from the concentrated solution. In this comparison both MoS$_2$ slurry catalysts were used with the same concentration (0.7 wt-% Mo) in the reaction mixture.

Figure 8:
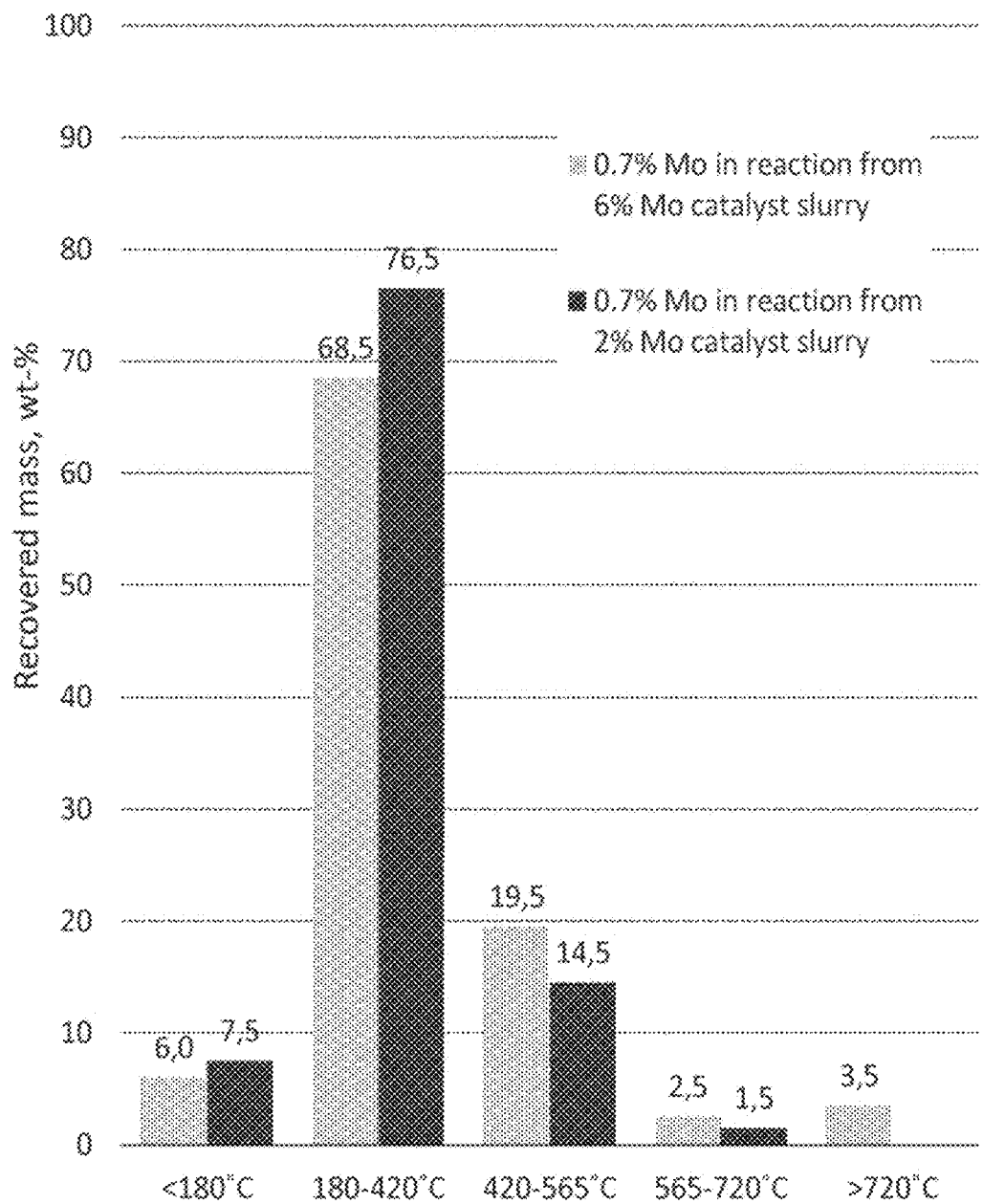
FIG. 8 shows boiling point distributions from simulated distillation by GC for TOP hydrotreatment products obtained with $MoS_2$ slurry catalysts from the concentrated and dilute slurry solutions.

The higher degree of hydrocracking for the small MoS$_2$ slurry catalyst particles produced from the dilute solution was also observed in the simulated distillation by GC. FIG. 8, with the boiling point distribution divided into various fractions, shows the highest formation of middle distillate components (180-420° C.) with the MoS$_2$ slurry catalyst produced from the dilute solution.

Figure 9:
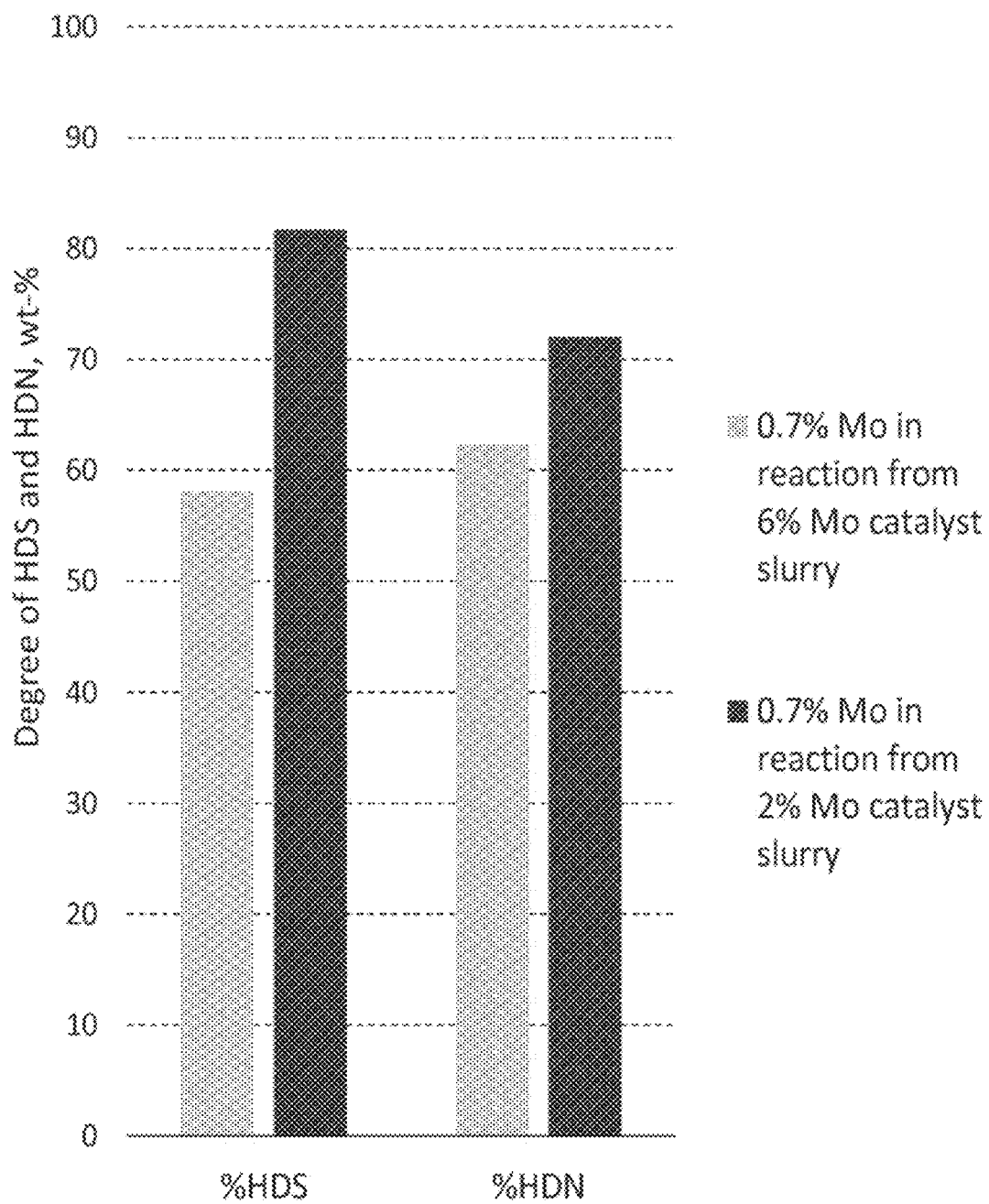
FIG. 9 shows the degree of sulphur (% HDS) and nitrogen (% HDN) removal in TOP hydrotreatment products obtained with $MoS_2$ slurry catalysts from the concentrated and dilute slurry solutions.

FIG. 9 shows the degree of sulphur and nitrogen removal in the same experiments as above. The small MoS$_2$ slurry catalyst particles produced from the dilute solution was more efficient in both HDS and HDN of TOP than the MoS$_2$ slurry catalyst produced from the concentrated solution of the Mo complex. This supports the better accessibility of reacting compounds to the catalytically active sites with smaller slurry particles.

These results proved that the small MoS$_2$ slurry catalysts particles produced from the dilute solution of the Mo-precursor were more efficient in hydrocracking and heteroatom removal compared to the MoS$_2$ slurry catalysts particles produced in the concentrated solution.

Comparison Between MoS$_2$ and Reference NiMoS/Al$_2$O$_3$

The samples compared in this example are products from hydrotreatment experiments TOPMo2 (MoS$_2$ slurry catalyst) and TOPNiMo (NiMoS/Al$_2$O$_3$).

Figure 10:
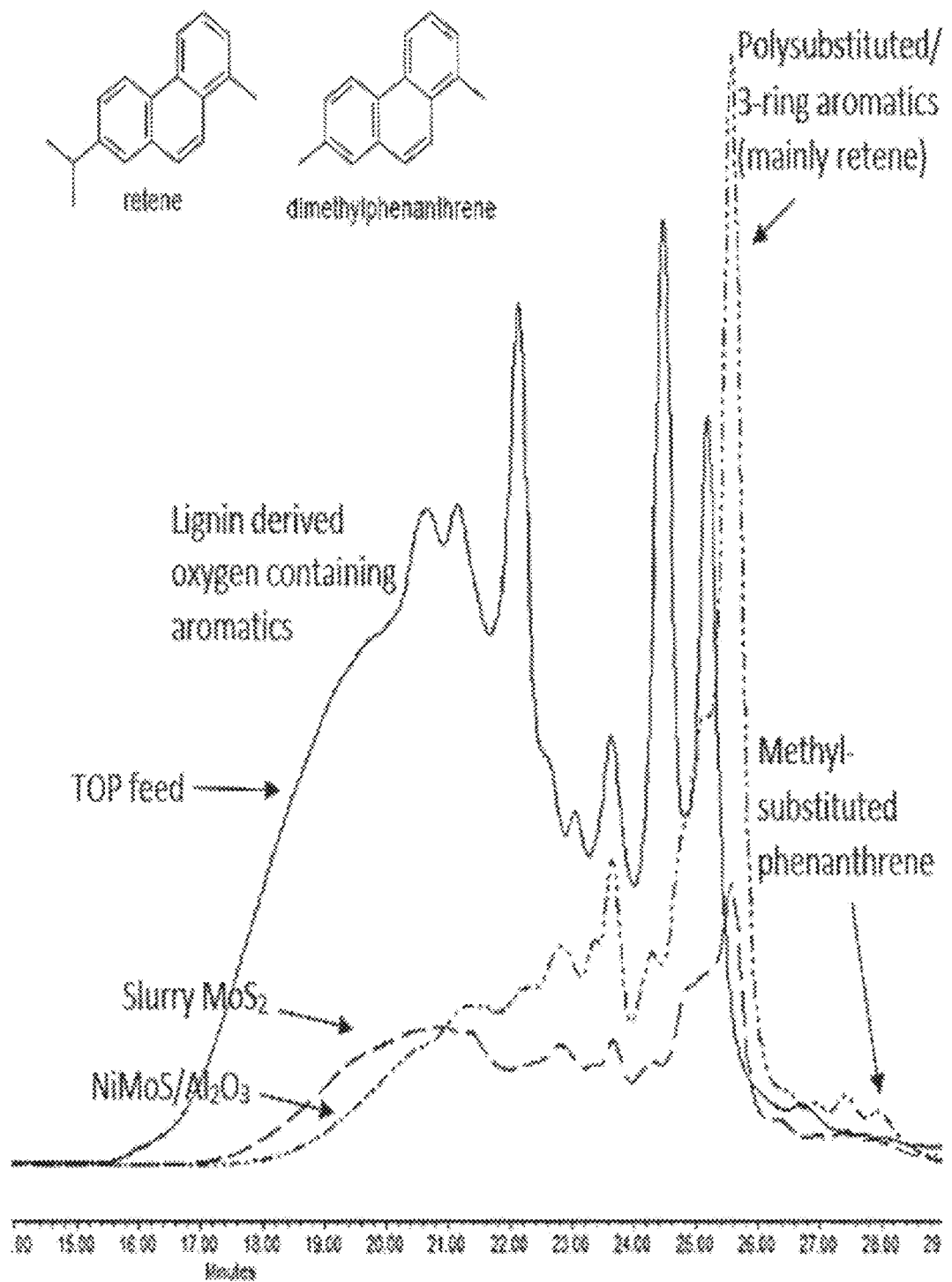
FIG. 10 shows GPC chromatograms for aromatics in TOP hydrotreatment products obtained with $MoS_2$ slurry catalyst compared to commercial $NiMoS/Al_2O_3$ extrudates.

The performance of the MoS$_2$ slurry catalyst was compared to that of a commercial NiMoS/Al$_2$O$_3$ catalyst at 320° C. and 50 bar. The experiments were done in the same way, except that MoS$_2$ was added as a slurry solution, whereas the NiMoS/Al$_2$O$_3$ catalyst was added as solids into the TOP feed in the autoclave. The changes in lignin derived high molecular weight components and the formation of new polyaromatic compounds is shown in FIG. 10.

The main difference between the performance of the MoS$_2$ slurry catalyst and the NiMoS/Al$_2$O$_3$ catalyst was the significant formation of unwanted polyaromatics, especially retene, with the latter catalyst. This proved the better accessibility of reacting high molecular weight compounds to the catalytically active sites with the mircoparticles in the MoS$_2$ slurry catalyst.

Liquefied Polymer Waste

Catalyst Preparation

The slurry catalyst was prepared using molybdenum 2-ethyl hexanoate metal complex (CAS 34041-09-3) containing 15 wt-% molybdenum as a metal precursor. De-aromatized light gas oil fraction was used as a solvent. Dimethyldisulphide (DMDS) was added to the precursor-solvent mixture and the solution was hydrogenated at 300° C. at maximum pressured of 75-84 bar for 3.5 hours to produce MoS$_2$ particles. The whole slurry catalyst containing solvent, ethyl hexane and MoS$_2$ was used as a catalyst for liquefied polymer waste hydrotreatment. The resulting catalyst had one micrometer MoS$_2$ particles in the solvent.

Hydrotreatment Results

In the experimental example, heavy fractions of the liquefied polymer waste feedstock was hydrotreated with $MoS_2$ slurry particles at 330° C. temperature in 120 bar pressure for 22 hour reaction time.

TABLE 7

Feedstock analysis results.

| | | | 14423900 liquefied polymer waste 360° C.-FBP |
|---|---|---|---|
| Density 50° C. | ENISO12185 | kg/m3 | 836.5 |
| Sulfur MWDXRF | ASTMD7039 | mg/kg | 2590 |
| XRF-S | NM380 | mg/kg | 2660 |
| XRF-Cl | NM380 | mg/kg | 449 |
| XRF-Br | NM380 | mg/kg | 297 |
| Chloride | NM382-C | mg/kg | 400 |
| Chloride | NM382-C | mg/kg | 400 |
| Total oxygen | ASTMD5622 | wt-% | 1.2 |
| Nitrogen | ASTMD5762 | mg/kg | 1100 |
| Ti-ICP | ASTMD5185 | mg/kg | <0.1 |
| Al-ICP | ASTMD5185 | mg/kg | <0.2 |
| Cr-ICP | ASTMD5185 | mg/kg | <0.3 |
| Cu-ICP | ASTMD5185 | mg/kg | 32 |
| Fe-ICP | ASTMD5185 | mg/kg | 150 |
| Mo-ICP | ASTMD5185 | mg/kg | <0.3 |
| Na-ICP | ASTMD5185 | mg/kg | <0.8 |
| Ni-ICP | ASTMD5185 | mg/kg | <0.2 |
| Pb-ICP | ASTMD5185 | mg/kg | 2.9 |
| Si-ICP | ASTMD5185 | mg/kg | 130 |
| Zn-ICP | ASTMD5185 | mg/kg | 9.4 |
| V-ICP | ASTMD5185 | mg/kg | <0.1 |
| Ba-ICP | ASTMD5185 | mg/kg | <0.3 |
| K-ICP | ASTMD5185 | mg/kg | <0.4 |
| Mg-ICP | ASTMD5185 | mg/kg | <0.3 |
| Mn-ICP | ASTMD5185 | mg/kg | <0.1 |
| P-ICP | ASTMD5185 | mg/kg | 350 |
| Zn-ICP | ASTMD5185 | mg/kg | 1.2 |

In Table 7 is the comparison of halogens, sulfur and nitrogen in the feedstocks and hydrotreated products. For sulfur and nitrogen removal, HDS and HDN conversions are calculated with correcting the results with the slurry catalyst solvent amount and liquid yield in the processing and presented on Table 7. The nitrogen removal from the tested feedstocks was very good as well all the Cl and Br was removed from the feeds in hydrotreatment.

In Table 8 are shown the metal contents of the feedstock and the hydrotreated product. The metal removal in the hydrotreatment was efficient. The HDM conversion for metal removal calculated from the sum of the metal above the detection limit in analysis and corrected with the liquid yield were above 96% for all the feeds. Metal removal was as efficient with the liquefied polymer waste feed with low metal amount (liquefied polymer waste feed 675 mg/kg, product 26 mg/kg).

TABLE 8

Halogen, sulfur and nitrogen contents in the liquefied polymer waste feed and hydrotreated product.

| | | 14423900 liquefied polymer waste feed | 15030077 liquefied polymer waste product |
|---|---|---|---|
| calculated HDN conversion | % | | 96 |
| calculated HDS conversion | % | | 83 |
| ASTMD5762 | nitrogen | mg/kg | 1100 | <40 |
| ASTMD7039 | sulfur MWDXRF | mg/kg | 2590 | 406 |
| NM380 | XRF-Cl | mg/kg | 449 | <7 |
| NM380 | XRF-Br | mg/kg | 297 | <5 |

TABLE 9

Metal content in the liquefied polymer waste feeds and hydrotreated products.

| | | | 14423900 liquefied polymer waste feed | 15030077 liquefied polymer waste product |
|---|---|---|---|---|
| calculated total metal removal conversion | | % | | 96 |
| Si | NM553-C | mg/kg | | 2.2 |
| P | NM553-C | mg/kg | | 23 |
| Fe | NM553-C | mg/kg | | 0.58 |
| Cu | NM553-C | mg/kg | | <0.055 |
| Zn | NM553-C | mg/kg | | <0.170 |
| Zn | NM553-C | mg/kg | | <0.025 |
| Pb | NM553-C | mg/kg | | <0.120 |
| Ti | ASTMD5185 | mg/kg | <0.1 | |
| Al | ASTMD5185 | mg/kg | <0.2 | |
| Cr | ASTMD5185 | mg/kg | <0.3 | |
| Cu | ASTMD5185 | mg/kg | 32 | |
| Fe | ASTMD5185 | mg/kg | 150 | |
| Mo | ASTMD5185 | mg/kg | <0.3 | |
| Na | ASTMD5185 | mg/kg | <0.8 | |
| Ni | ASTMD5185 | mg/kg | <0.2 | |
| Pb | ASTMD5185 | mg/kg | 2.9 | |
| Si | ASTMD5185 | mg/kg | 130 | |
| Zn | ASTMD5185 | mg/kg | 9.4 | |
| V | ASTMD5185 | mg/kg | <0.1 | |
| Ba | ASTMD5185 | mg/kg | <0.3 | |
| Ca | ASTMD5185 | mg/kg | <0.4 | |
| Mg | ASTMD5185 | mg/kg | <0.3 | |
| Mn | ASTMD5185 | mg/kg | <0.1 | |
| P | ASTMD5185 | mg/kg | 350 | |
| Zn | ASTMD5185 | mg/kg | 1.2 | |

The slurry catalyst compared for the solid catalyst particles hydrotreating liquefied polymer waste feedstock (14423900) with BDC-1 catalyst particles in liquid phase batch test run. Test run was carried out at 300° C. with 90 bar pressure for 6 hours reaction time. The reaction product (14626158) of the hydrotreated on the solid catalyst contained 120 mg/kg nitrogen, 480 mg/kg sulfur, 14 mg/kg total metals and no chlorine.

For nitrogen removal slurry catalyst was remarkably more efficient than solid catalyst, sulfur removal on slurry catalyst was slightly better (sulfur in slurry catalyst product 406 mg/kg) than on solid particles and in metal removal on the both catalysts were on the same level.

Different non-binding example aspects and embodiments of the present invention have been illustrated in the foregoing. The embodiments are used merely to explain selected aspects or steps that may be utilized when implementing the present invention. Some embodiments may be presented herein only with a reference to a certain aspect of the invention. It should be appreciated that the embodiments may apply to other aspects of the present invention, as well.

Consequently, any appropriate combination of the embodiments and the aspects may be formed. Any combination of aspects or embodiments as disclosed herein may also be made without at least one non-essential feature disclosed in an aspect or embodiment.

The invention claimed is:

1. A hydrotreatment process comprising:
 a. providing in a reactor a liquid feedstock; and
 b. hydrotreating the liquid feedstock in liquid phase and at a temperature selected from a range 280-380° C. in a presence of catalytic $MoS_2$ microparticle slurry, to provide a liquid reaction product with decreased heteroatom content; wherein:
 at least 90 wt % of catalytic $MoS_2$ microparticles in the $MoS_2$ microparticle slurry have a size below 7 μm, wherein the size of a microparticle is expressed as an average of the longest dimension and the shortest dimension of the microparticle,
 at least 90 wt % of the microparticles have an aspect ratio of 0.40-1.0, and
 the $MoS_2$ microparticle slurry is used in an amount of 10 ppm-500 ppm, based on a total weight amount of a reaction mixture in the reactor.

2. The hydrotreatment process of claim 1, wherein the feedstock contains about 1-40 wt % oxygen.

3. The hydrotreatment process of claim 1, wherein the feedstock contains at least one or more of:
 crude tall oil, tall oil pitch, crude fatty acid, tall oil fatty acid, distilled tall oil, liquefied lignocellulosic biomass, bio-oil, biocrude, liquefied waste polymer, and/or a combination thereof.

4. The hydrotreatment process of claim 1, wherein the temperature is selected from a range of 320-370° C.

5. The hydrotreatment process of claim 1, wherein the feedstock contains:
 liquefied polymer waste, and the temperature is selected from a range of 280-320° C.

6. The hydrotreatment process of claim 1, wherein the hydrotreating step is carried out at a pressure selected from a range of 70-200 bar such that the feedstock is in liquid phase.

7. The hydrotreatment process of claim 6, comprising:
 controlling the pressure by feeding hydrogen gas into the reactor.

8. The hydrotreatment process of claim 1, wherein the feedstock contains:
 liquefied polymer waste, and the pressure is selected from a range of 70-90 bar.

9. The hydrotreatment process of claim 1, wherein the hydrotreatment removes at least 50 wt % of sulphur, at least 40 wt % of nitrogen, and optionally at least 50 wt % of oxygen from the feedstock.

10. The hydrotreatment process of claim 1, wherein the catalytic $MoS_2$ microparticles are provided in at least partially crystalline form in the reactor.

11. The hydrotreatment process of claim 1, wherein the liquid reaction product predominantly contains hydrocarbons having a maximum boiling point of 565° C. at atmospheric pressure.

12. The hydrotreatment process of claim 1, wherein the process is carried out in a stirred tank reactor.

13. The hydrotreatment process of claim 1, wherein the catalytic $MoS_2$ microparticle slurry has below 5 wt % molybdenum based on a total weight of the catalytic $MoS_2$ microparticle slurry.

14. A process for manufacturing catalytic molybdenum sulphide microparticles comprising:
 a. providing in a hydrocarbon solvent a Mo precursor and a $H_2S$ source to provide a reaction mixture; and
 b. hydrogenating, under stirring, the reaction mixture at a temperature of at least 180° C. to form a hydrogenated reaction mixture, such that a combination of temperature and pressure is sufficient for evaporating water in the reaction mixture,
 wherein at least 90 wt % of the catalytic molybdenum sulphide microparticles manufactured from the process have a size below 7 μm, wherein the size of a microparticle is expressed as an average of the longest dimension and the shortest dimension of the microparticle, and
 wherein the hydrogenated reaction mixture contains the Mo precursor in an amount ranging from 2.4-6.2 wt % based on a total amount of the hydrogenated reaction mixture.

15. The process of claim 14, wherein the Mo precursor is selected from at least one or more of:
 molybdenum 2-ethyl hexanoate, carboxylate anion of 3-cyclopentylpropionic acid, cyclohexanebutyric acid, biphenyl-2-carboxylic acid, 4-heptylbenzoic acid, 5-phenylvaleric acid, and/or geranic acid (3,7-dimethyl-2,6-octadienoic acid).

16. The process of claim 14, wherein the $H_2S$ source is a polysulphide.

17. The process of claim 14, wherein an amount of $H_2S$ source and an amount of Mo precursor provides a molar excess of sulphur to molybdenum, which is 4-7 mol S/mol Mo.

18. The process of claim 14, wherein the $H_2S$ source is selected from at least one or more of:
 a disulphide, di-tert-dodecyl polysulphide, a mercaptan, $H_2S$ gas, and/or any combination thereof.

* * * * *